US010728253B2

(12) United States Patent
Seed et al.

(10) Patent No.: US 10,728,253 B2
(45) Date of Patent: Jul. 28, 2020

(54) PERMISSION BASED RESOURCE AND SERVICE DISCOVERY

(71) Applicant: Convida Wireless, LLC, Wilmington, DE (US)

(72) Inventors: Dale N. Seed, Allentown, PA (US); William Robert Flynn, IV, Schwenksville, PA (US); Quang Ly, North Wales, PA (US); Donald A. Fleck, Emmaus, PA (US); Richard P. Gorman, Ivyland, PA (US); Nicholas J. Podias, Brooklyn, NY (US); Michael F. Starsinic, Newtown, PA (US); Hongkun Li, Malvern, PA (US); Zhuo Chen, Claymont, DE (US)

(73) Assignee: Convida Wireless, LLC, Wilmington, DE (US)

(*) Notice: Subject to any disclaimer, the term of this patent is extended or adjusted under 35 U.S.C. 154(b) by 63 days.

(21) Appl. No.: 15/526,568

(22) PCT Filed: Nov. 13, 2015

(86) PCT No.: PCT/US2015/060608
§ 371 (c)(1),
(2) Date: May 12, 2017

(87) PCT Pub. No.: WO2016/077713
PCT Pub. Date: May 19, 2016

(65) Prior Publication Data
US 2017/0318023 A1 Nov. 2, 2017

Related U.S. Application Data

(60) Provisional application No. 62/079,972, filed on Nov. 14, 2014.

(51) Int. Cl.
*G06F 21/62* (2013.01)
*H04L 29/06* (2006.01)
(Continued)

(52) U.S. Cl.
CPC .......... *H04L 63/102* (2013.01); *H04L 63/101* (2013.01); *H04L 63/105* (2013.01);
(Continued)

(58) Field of Classification Search
None
See application file for complete search history.

(56) References Cited

U.S. PATENT DOCUMENTS 8,209,427 B2 * 6/2012 Brown ............... G06F 21/10
709/225
8,990,891 B1 * 3/2015 Chickering ........... G06F 21/74
726/1
(Continued)

FOREIGN PATENT DOCUMENTS

JP 2002-073554 A 3/2002
JP 2005-050286 A 2/2005
(Continued)

OTHER PUBLICATIONS

KR20150063906. English Translation. (Year: 2015).*
(Continued)

*Primary Examiner* — Venkat Perungavoor
(74) *Attorney, Agent, or Firm* — BakerHostetler

(57) ABSTRACT

Current discovery mechanisms lack capabilities, such as capabilities related to permissions associated with a given registrant for example. In an example embodiment, a registrant of a service layer can communicate with a network node that hosts the service layer. The network node may receive a discovery request for a resource from the registrant. The discovery may request include various context.
(Continued)

For example, the context of the discovery request may be indicative of an operation that the registrant intends to perform on the resource, a role that the registrant intends to assume if the registrant accesses the resource, a location in which the registrant intends to access the resource, or a subscription plan that the registrant intends to use if the registrant accesses the resource. Based on the context of the discovery request, the network node may determine whether one or more resources at the service layer satisfy the discovery request.

21 Claims, 17 Drawing Sheets

(51) Int. Cl.
    *H04W 4/70*     (2018.01)
    *H04W 12/08*     (2009.01)
    *H04L 29/08*     (2006.01)
    *H04W 48/16*     (2009.01)
    *G06F 21/71*     (2013.01)
    *H04W 12/00*     (2009.01)
    *H04L 12/24*     (2006.01)

(52) U.S. Cl.
    CPC ............ *H04L 63/166* (2013.01); *H04L 67/16* (2013.01); *H04W 4/70* (2018.02); *H04W 12/08* (2013.01); *H04W 48/16* (2013.01); *H04L 41/0273* (2013.01); *H04L 67/18* (2013.01); *H04L 69/16* (2013.01); *H04W 12/00503* (2019.01)

(56) References Cited

U.S. PATENT DOCUMENTS

| | | | | |
|---|---|---|---|---|
| 9,154,501 | B2* | 10/2015 | Jin | H04W 12/02 |
| 2005/0251851 | A1* | 11/2005 | Patrick | G06F 21/604 |
| | | | | 726/1 |
| 2005/0257245 | A1* | 11/2005 | Patrick | H04L 63/0263 |
| | | | | 726/1 |
| 2006/0026180 | A1* | 2/2006 | Kres | G06F 16/283 |
| 2006/0168304 | A1 | 7/2006 | Bauer et al. | |
| 2007/0156693 | A1* | 7/2007 | Soin | G06F 21/604 |
| 2008/0016580 | A1 | 1/2008 | Dixit et al. | |
| 2009/0288135 | A1* | 11/2009 | Chang | H04L 63/0263 |
| | | | | 726/1 |
| 2010/0154043 | A1* | 6/2010 | Castellucci | G06F 21/6218 |
| | | | | 726/7 |
| 2010/0263025 | A1* | 10/2010 | Neitzel | H04L 63/105 |
| | | | | 726/4 |
| 2011/0225659 | A1* | 9/2011 | Isaacson | G06F 21/604 |
| | | | | 726/28 |
| 2011/0231443 | A1* | 9/2011 | Hannel | H04L 63/105 |
| | | | | 707/776 |
| 2011/0321135 | A1* | 12/2011 | Dickerson | G06F 21/6218 |
| | | | | 726/4 |
| 2012/0304257 | A1 | 11/2012 | Kalofonos et al. | |
| 2013/0007278 | A1* | 1/2013 | Srinivasan | H04W 4/70 |
| | | | | 709/225 |
| 2013/0188515 | A1* | 7/2013 | Pinheiro | H04L 67/16 |
| | | | | 370/254 |
| 2013/0205385 | A1* | 8/2013 | Roesner | G06F 21/6245 |
| | | | | 726/17 |
| 2013/0346504 | A1* | 12/2013 | Huang | H04L 12/185 |
| | | | | 709/204 |
| 2014/0173755 | A1 | 6/2014 | Wahl | |
| 2014/0221032 | A1 | 8/2014 | Yang | |
| 2015/0358824 | A1* | 12/2015 | Kim | H04W 12/0802 |
| | | | | 726/4 |
| 2016/0112981 | A1* | 4/2016 | Ahn | H04W 4/70 |
| | | | | 455/500 |
| 2016/0302069 | A1* | 10/2016 | Kim | H04L 9/32 |

FOREIGN PATENT DOCUMENTS

| | | |
|---|---|---|
| JP | 2005-354679 A | 12/2005 |
| JP | 2006-506877 | 2/2006 |
| JP | 2007-299053 A | 11/2007 |
| JP | 2009-544076 | 12/2009 |

OTHER PUBLICATIONS

OneM2M Technical Specification, oneM2M-TS-0003-V1.0.1, Security Solutions, Jan. 30, 2015, 91 pages.
OneM2M Technical Specification, oneM2M-TS-0001-V1.6.1, Functional Architecture, Jan. 30, 2015, 321 pages.
OMA Lightweight M2M (LWM2M) Technical Specification, Draft Version 1.0, Apr. 12, 2013, 73 pages.
Machine-to-Machine Communications (M2M) Functional Architecture, Draft ETSI TS 102 690 V1.1.1, Oct. 2011, 280 pages.
OneM2M TS-0001, OneM2M Functional Architecture Baseline Draft, Aug. 2014, 297 pages.

\* cited by examiner

Permission-based Discovery Request Inputs 1400

Enter Permission-based Discovery Criteria Below:

- targetedOperations
- targetedRoles
- targetedLocation
- currentSubscription
- newSubscription

Search

Permission-based Discovery Results 1402

Discovery Results 1404a with Granted Permissions:
- *Resources*
- *Services*
- *Operations*
- *Roles*
- *Location*
- *requiredSubscription*

Discovery Results 1404b with Denied Permissions:
- *Resources*
- *Services*
- *Operations*
- *Roles*
- *Location*
- *requiredSubscription*

Fig. 14B

PERMISSION BASED RESOURCE AND SERVICE DISCOVERY

CROSS REFERENCE TO RELATED APPLICATIONS

This application is a National Stage Application filed under 35 U.S.C. 371 of International Application No. PCT/US2015/060608, filed Nov. 13, 2015, which claims the benefit of U.S. Provisional Patent Application Ser. No. 62/079,972, filed Nov. 14, 2014, the disclosure of which is hereby incorporated by reference as if set forth in its entirety herein.

BACKGROUND

From a protocol stack perspective, service layers are typically layered on top of existing network protocol stacks. A service layer may be a software layer that hosts resources and services. A service may refer to a set of software functionalities that are accessed via a supported interface. A resource generally refers to an addressable entity having a representation that may be manipulated via various commands. Thus, service layers can provide value-added services to client applications and other services, and service layers are often categorized as "middleware" service layers. For example, FIG. 1 depicts an example networking protocol stack 100 that depicts a service layer 22 between applications 20 and various networking protocols 102, such as application protocols 104. In accordance with the example depicted in FIG. 1, the service layer 22 can support value-added service capabilities through a set of application programming interfaces (APIs) and underlying networking interfaces. By way of another example, the service layer 22 can be layered directly over a transport protocol 106, such as transmission control protocol (TCP) or user datagram protocol (UDP) for example. By way of yet another example, the service layer 22 can be layered directly over a protocol that is not in accordance with a representational state transfer (RESTful) architecture, which can be referred to as a non-RESTful protocol, such as simple object access protocol (SOAP) for example.

A node or entity may register to a service layer. The terms node and entity are used interchangeably herein, without limitation, unless otherwise specified. A node or entity that registers to a service layer may be referred to as a service layer registrant. Entities that may register to a given service layer may include, for example, an individual service, an application, or another instance of the service layer. Existing service layers may support some discovery mechanisms. Such discovery mechanisms allow registrants of a given service layer to query the given service layer to find resources that are hosted by the given service layer. Such discovery mechanisms, however, lack capabilities, such as capabilities related to permissions associated with a given registrant for example.

SUMMARY

Described herein are methods, device, and systems for permission-based resource and service discovery. In an example embodiment, a system includes a registrant, which may include an application or a common services entity for example, that communicates with a network node that hosts a service layer, which can be referred to as a common services entity. The network node may receive a discovery request, from the registrant, for a resource, for instance a resource that the registrant is not authorized to access. The discovery may request include various context. For example, the context of the discovery request may be indicative of at least one of an operation that the registrant intends to perform on the resource, a role that the registrant intends to assume if the registrant accesses the resource, a location in which the registrant intends to access the resource, and a subscription plan that the registrant intends to use if the registrant accesses the resource. Based on the context of the discovery request, the network node may determine whether one or more resources at the service layer satisfy the discovery request. The network node may send a discovery response to the registrant, wherein the discovery response indicates a result of the determination of whether the one or more resources satisfy the discovery request. When the one or more resources do not satisfy the discovery request, the network node may send at least one resource to the registrant such that the registrant can obtain permission to access the at least one resource. When the one or more resources satisfy the discovery request, the network node may send the one or more resources to the registrant.

BRIEF DESCRIPTION OF THE DRAWINGS

A more detailed understanding may be had from the following description, given by way of example in conjunction with the accompanying drawings wherein:

FIG. 14A is an example graphical user interface (GUI) for defining permission based resource or service discovery criteria in accordance with an example embodiment; and FIG. 14B is an example GUI that can render results based on the discovery criteria defined using the GUI depicted in FIG. 14A in accordance with an example embodiment.

DETAILED DESCRIPTION OF ILLUSTRATIVE EMBODIMENTS

The ensuing detailed description is provided to illustrate exemplary embodiments and is not intended to limit the scope, applicability, or configuration of the invention. Various changes may be made in the function and arrangement of elements and steps without departing from the spirit and scope of the invention.

Figure 13A:
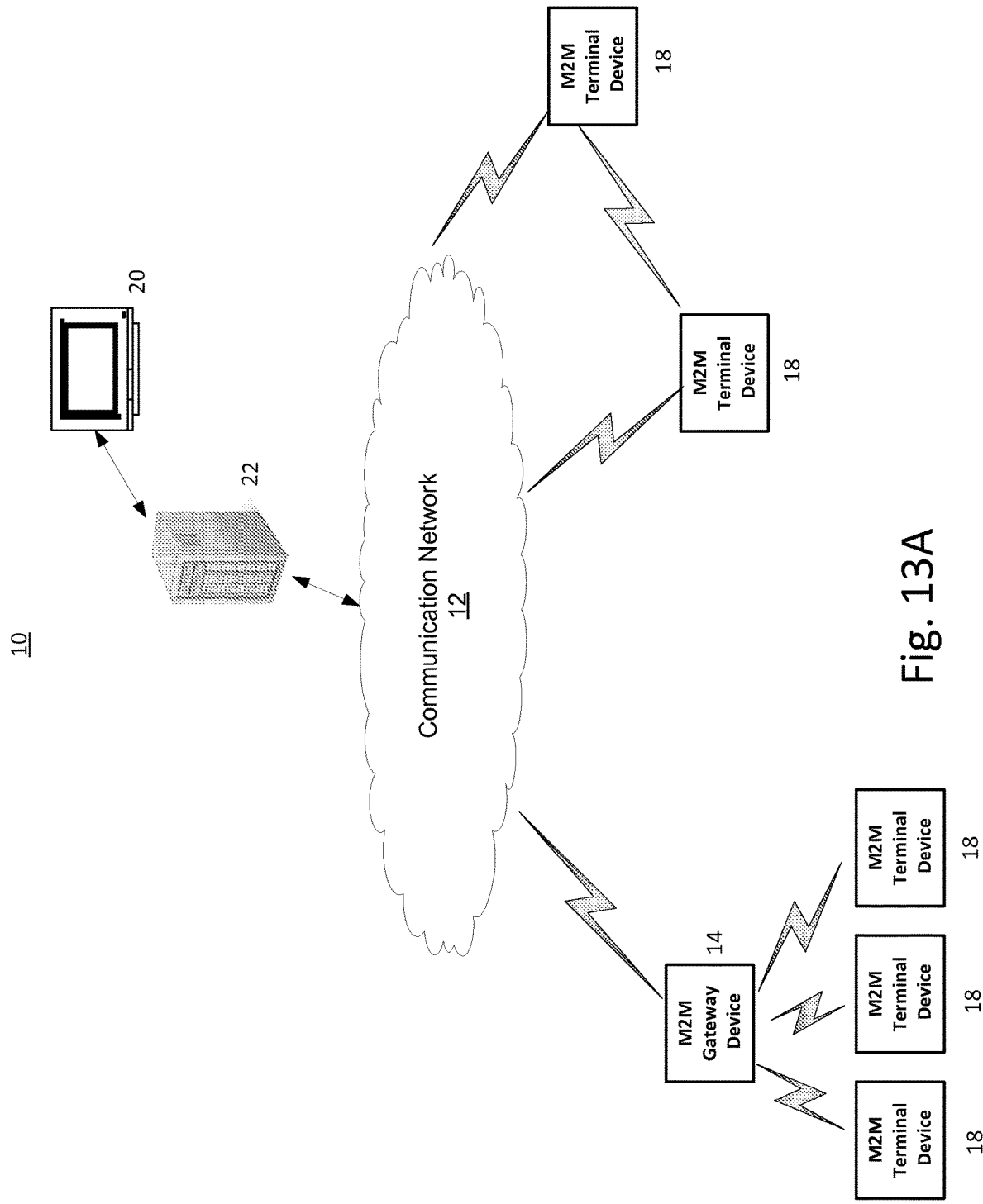
FIG. 13A is a system diagram of an example machine-to-machine (M2M) or Internet of Things (IoT) communication system in which one or more disclosed embodiments may be implemented.
Figure 13B:
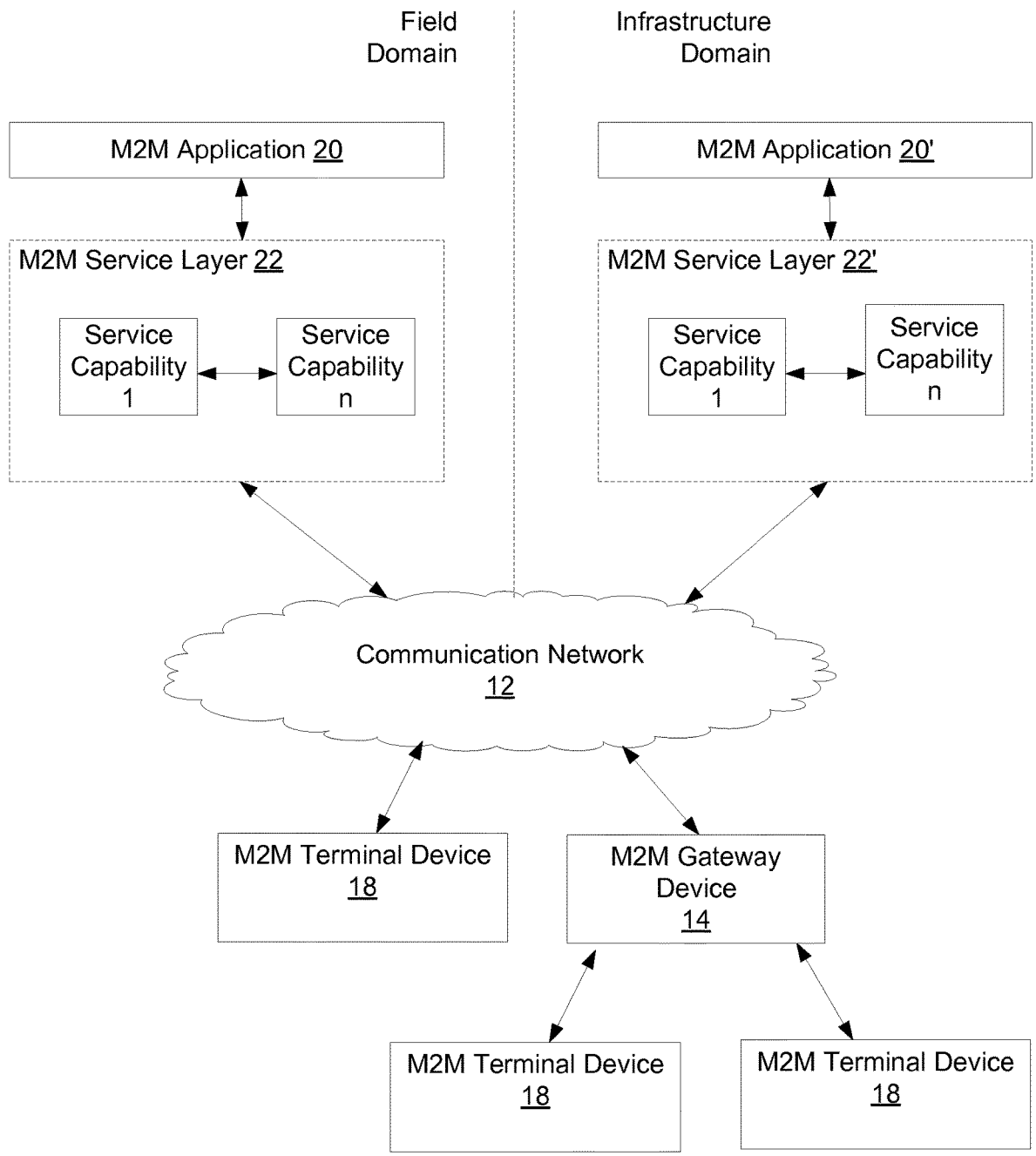
FIG. 13B is a system diagram of an example architecture that may be used within the M2M/IoT communications system illustrated in FIG. 13A.

Referring generally to FIGS. 13A and 13B, which are described in more detail below, an example machine-to-machine (M2M), Internet of Things (IoT), or Web of Things (WoT) communication system 10 can include a plurality of devices, such as a plurality of machine-to-machine (M2M) devices for example, and a service layer 22 that can communicate with the M2M devices via communication network 12. As used herein, an M2M device may refer to any device that communicates in a network, such as a gateway device 14 or terminal (endpoint) devices 18 for example. Each of the M2M gateway devices 14 and M2M terminal devices 18 may be configured to transmit and receive signals via the communication network 12 or direct radio link. The M2M devices 18 may also receive data from an M2M application 20 or another M2M device 18. Further, data and signals may be sent to and received from the M2M application 20 via the M2M service layer 22.

Figure 1:
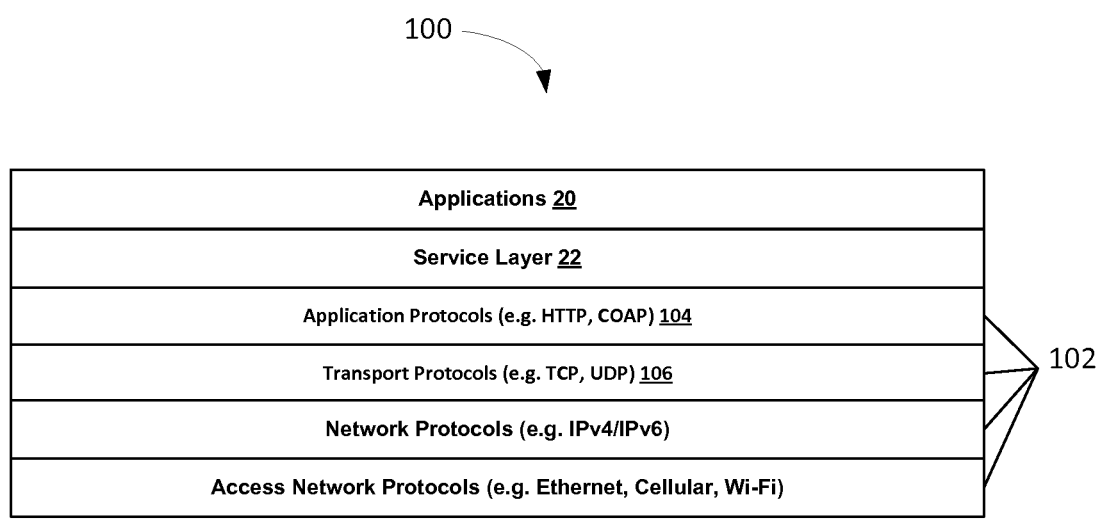
FIG. 1 is a depiction of an example protocol stack that includes a service layer.

It will be understood that the M2M service layer 22 may communicate with any number of M2M applications, M2M gateway devices, M2M terminal devices, and communication networks as desired. The M2M service layer 22 may be implemented by one or more servers, computers, or the like. The service layer 22 can provide various services and capabilities to the M2M applications 20, M2M gateway devices 14, and M2M devices 18. The M2M service layer 22 may be implemented as a software middleware layer (above the IP stack 102 in FIG. 1) that supports value-added services for M2M applications and devices through a set of Application Programming Interfaces (APIs) and underlying networking interfaces. For example, the service layer 22 may be a software layer that hosts resources and services that are made available to registrants of the service layer 22 via the set of APIs and underlying networking interfaces. A service may generally refer to a set of related functionalities that are accessed via an interface. As used herein, unless otherwise specified, a resource may refer to any addressable entity that has a representation that can be manipulated. For example, resource representations can be manipulated via RESTful mechanisms, such as Create, Retrieve, Update, or Delete for example. A registrant of a given service layer (service layer registrant) may refer to any entity that is registered to the service layer. Thus, for example, registrants may include applications, individual services, other instances of the service layer, or the like. For convenience, unless other specified, the terms resource and service are used interchangeably, and thus a resource can include a service and a service can include a resource.

M2M service layers can be deployed on various M2M nodes, such as servers, gateways, and devices for example. As used herein, unless otherwise specified, an M2M node, which can also be referred to generally as a network node, refers to any device, gateway, or server within an M2M network, such as the M2M system 10 for example. An M2M node may refer to any addressable entity within a network that hosts resources or services. Thus, a node may refer to a physical entity (e.g., a device, gateway, or server), a virtual entity (e.g., a virtual machine, or a combination thereof that resides within a network.

Figure 2:
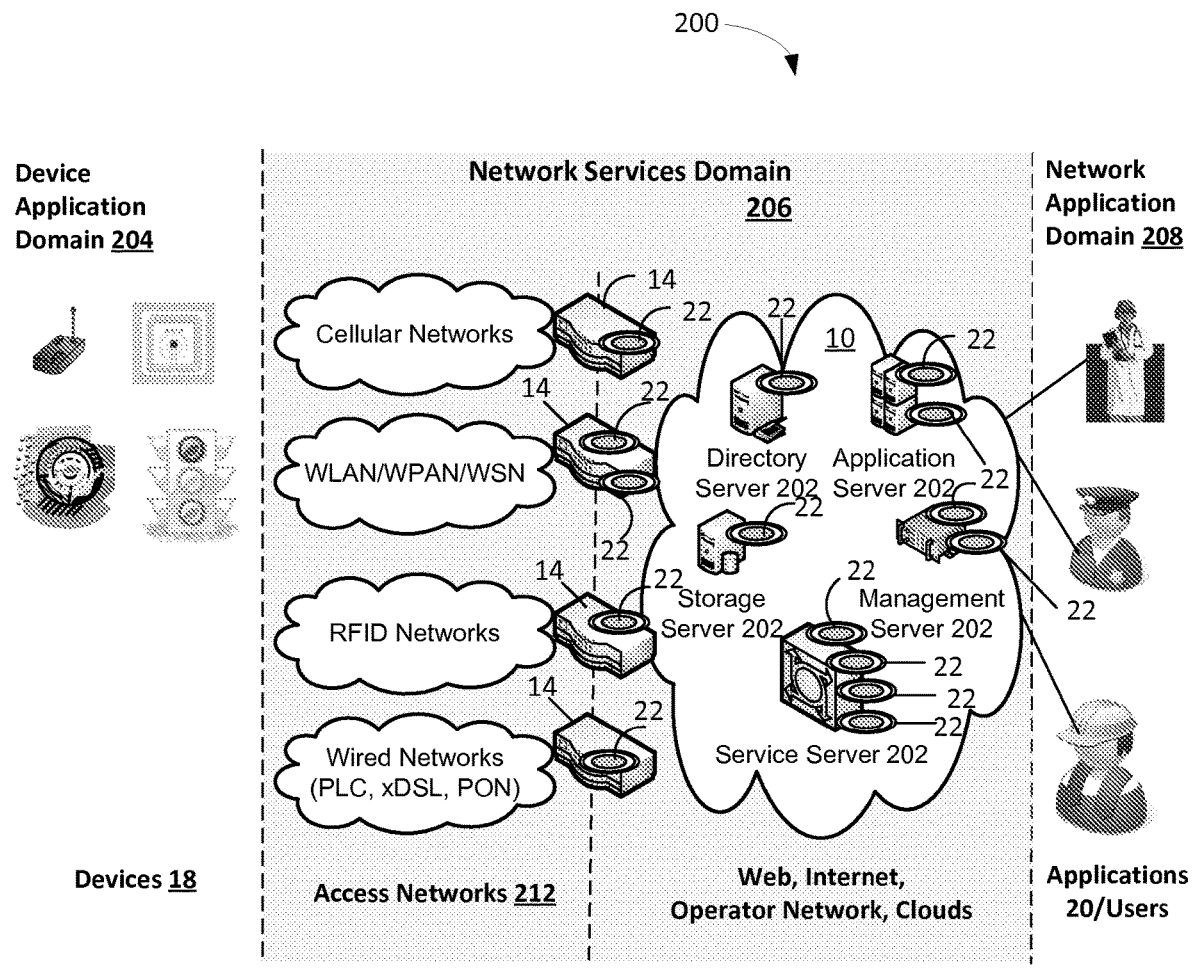
FIG. 2 is a system diagram that depicts an example deployment of instances of the service layer.

Referring now to FIG. 2, an example M2M system or network 200 represents an example deployment scenario for the service layer 22. As shown, the instances of the service layer 22, which can be referred to as service layer instances 22, can be deployed on various network nodes, such as gateways 14 and servers 202 for example. Thus, the service layer 22 can provide services to network applications, device applications, and/or various network nodes for example. In accordance with the illustrated example, the network 200 includes a device application domain 204, a network services domain 206, and a network application domain 208. The network application domain 208 may include various applications 20 and users of the applications 20. The network services domain may include various servers 202 that are accessible to the applications 20 via a communications network 12, which can be an operator network, a cloud network, the Internet, or the like. The servers 202 may communicate with various access networks 212, and thus to various M2M devices 18, via gateway devices 14. Example M2M devices 18 include, as shown and without limitation, sensors, actuators, RFID tags, and virtual objects. Various embodiments described herein refer to the system 200 or its components for convenience. It will be appreciated that the example system 200 and portions thereof are simplified to facilitate description of the disclosed subject matter and is not intended to limit the scope of this disclosure. Other devices, systems, and configurations may be used to implement the embodiments disclosed herein in addition to, or instead of, a system such as the system 200, and all such embodiments are contemplated as within the scope of the present disclosure.

By way of further background, an M2M/IoT service layer, for instance the M2M service layer 22, is an example service layer that may be specifically targeted toward providing value-added services for M2M/IoT type devices and applications. There are multiple M2M architectures with service layers, such as European Telecommunications Standards Institute (ETSI) M2M service layer discussed in draft ETSI TS 102.690 1.1.1 (2011-10), the Open Mobile Alliance (OMA) Lightweight M2M service layer discussed in draft version 1.0—14 Mar. 2013, and the oneM2M service layer discussed in oneM2M-TS-0001 oneM2M Functional Architecture-V-0.1.2. M2M service layer architectures (e.g., ETSI M2M, OMA LWM2M, and oneM2M). As mentioned above, an M2M service layer can provide applications and devices access to a collection of M2M centric capabilities supported by the service layer. A few examples of capabilities include, presented without limitation, security, charging, data management, device management, discovery, provisioning, and connectivity management. These capabilities are made available to applications via APIs that can make use of message formats, resource structures, and resource representations supported by the M2M service layer.

Figure 3:
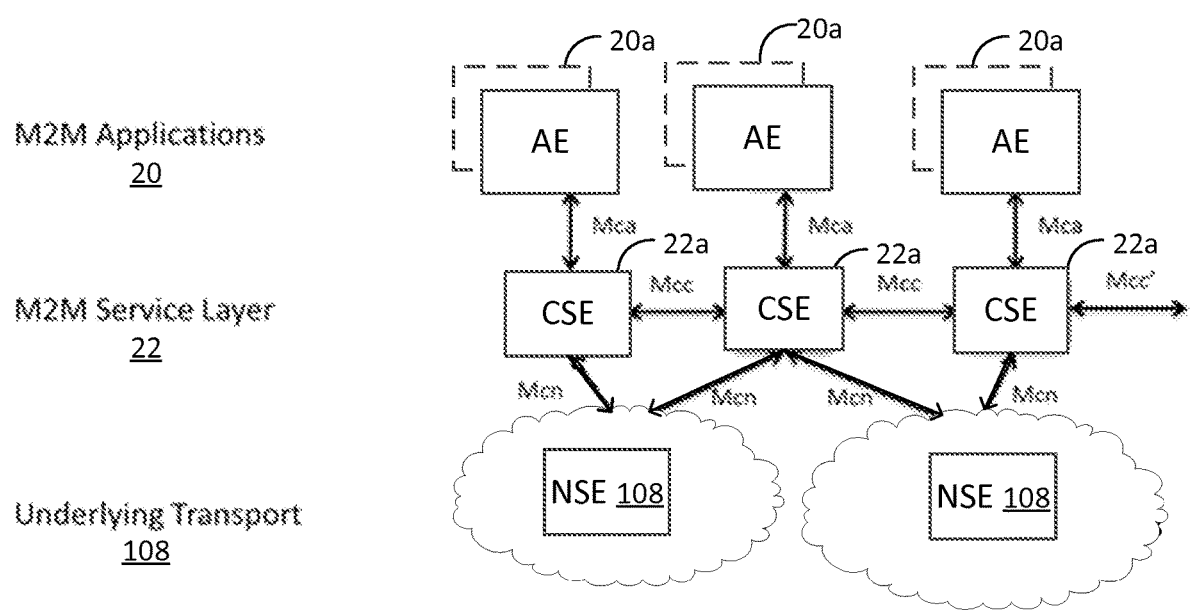
FIG. 3 depicts an example oneM2M architecture.

A goal of oneM2M is to develop technical specifications for a common M2M service layer that can be readily embedded within various hardware and software platforms. Such an M2M service layer may be relied upon to connect a variety of devices in the field with M2M application servers worldwide. Referring also to FIG. 3, the oneM2M services layer supports a set of Common Service Functions (CSFs), which can be referred to generally as service capabilities. An instantiation of a set of one or more particular types of CSFs is referred to as a Common Services Entity 22a (CSE), which can also be referred to simply as a service layer 22, that can be hosted on different types of network nodes (e.g., infrastructure node, middle node, application-specific node). These common functions are exposed via the Mca, Mcc, and Mcn reference points as shown in FIG. 3. The Mca reference point designates communication flows between an Application Entity (AE) 20a, which can also be referred to simply as applications 20, and a CSE 22a. The Mcc reference point designates communication flows between CSEs that are in the same M2M Service Provider (SP) domain. Communications across Mca and Mcc may take place via paired Request/Response messages, wherein each request performs a specific RESTful operation (e.g., Create, Retrieve, Update, and Delete) upon a resource hosted on the targeted CSE 22a.

Figure 4:
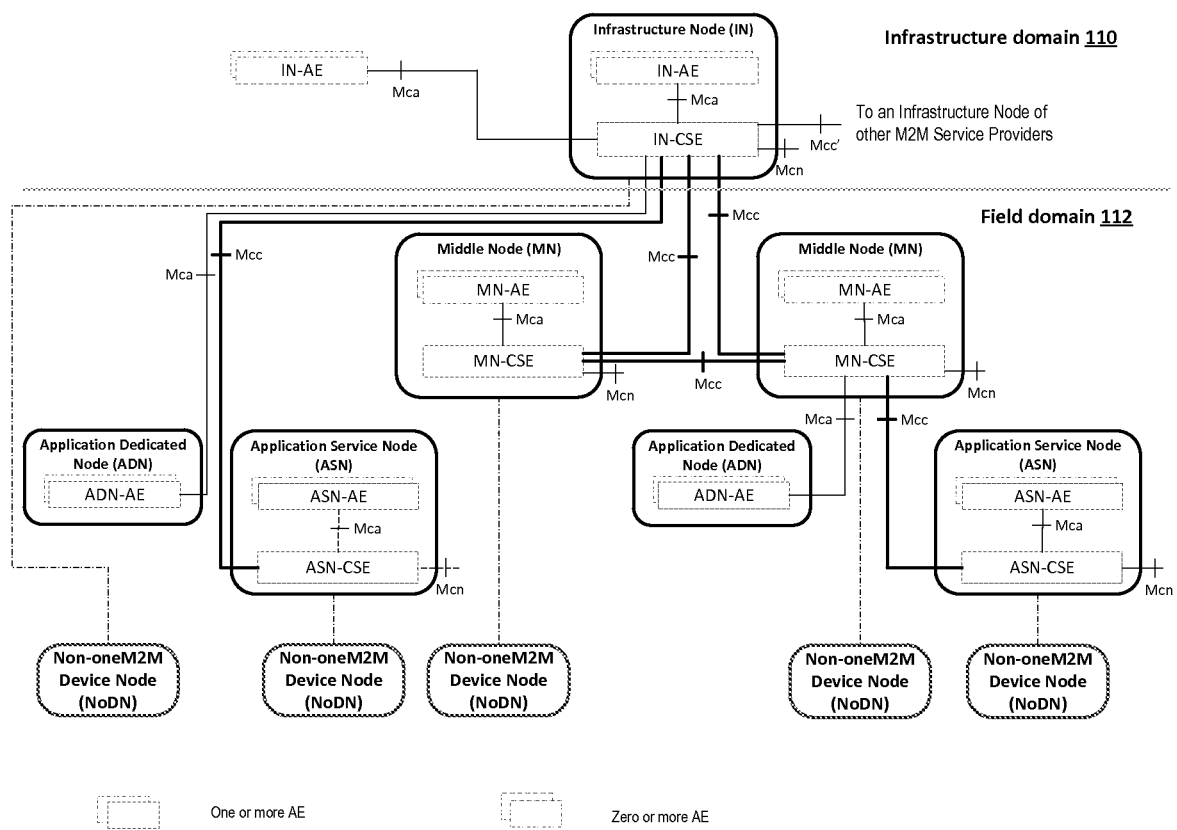
FIG. 4 depicts an example configuration of the oneM2M architecture.

Referring also to FIG. 4, an M2M/IoT/WoT communication system may include the Infrastructure Domain 110 and a Field Domain 112. The Infrastructure Domain 110 refers to the network side of the end-to-end M2M deployment, and the Field Domain 112 refers to the area networks that are usually behind an M2M gateway. Mcc' denotes a reference point that is used for communication flows between CSEs 22a that are located in the Infrastructure Domain 110 of different M2M service providers (SPs). The Mcn is used between a given CSE 22a and an underlying Network Services Entity 108 (NSE) for services other than transport and connectivity. CSEs may be hosted on architectural entities referred to as nodes. A node may refer to a functional entity that hosts a CSE and zero or more AEs. Alternatively, a node may refer to a functional entity that hosts one or more AEs. The oneM2M architecture supports various types of node configurations, some of which are shown in FIG. 4 by way of example.

Figure 5:
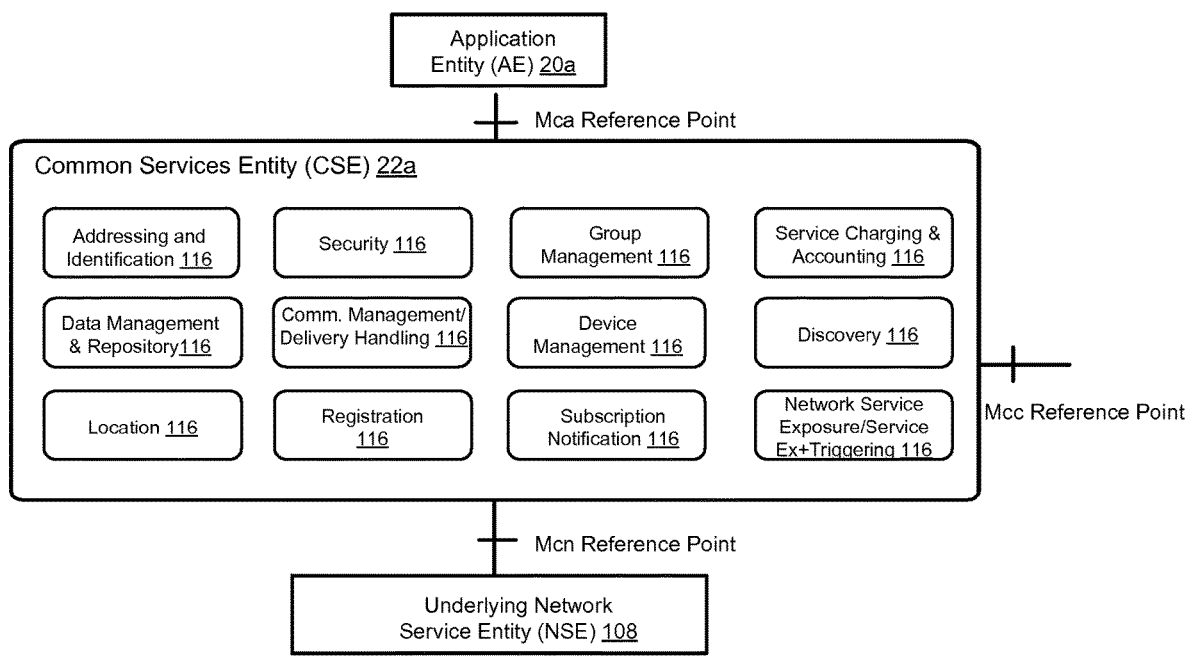
FIG. 5 is a block diagram that depicts example common service functionalities of the oneM2M architecture.

Referring also to FIG. 5, an example set of common service functions 116 (CSFs) that are supported by oneM2M is shown. A given CSE 22a may support one or more, for instance all, of the CSFs 116 depicted in FIG. 5.

By way of further background, in a typical oneM2M RESTful architecture, CSFs 116 are represented as a set of one or more resources. A resource refers to a uniquely addressable entity in the architecture having a representation that can be manipulated via RESTful mechanisms such as, for example, Create, Retrieve, Update, and Delete. Resources are addressed using Universal Resource Identifiers (URIs). A resource may contain child resources and attributes. A child resource is a resource that has a containment relationship with a parent resource. The parent resource representation may contain references to its child resources. The lifetime of a child resource may be limited by the parent's resource lifetime. Each resource supports one or more attributes that are indicative of information associated with the resource.

Figure 6:
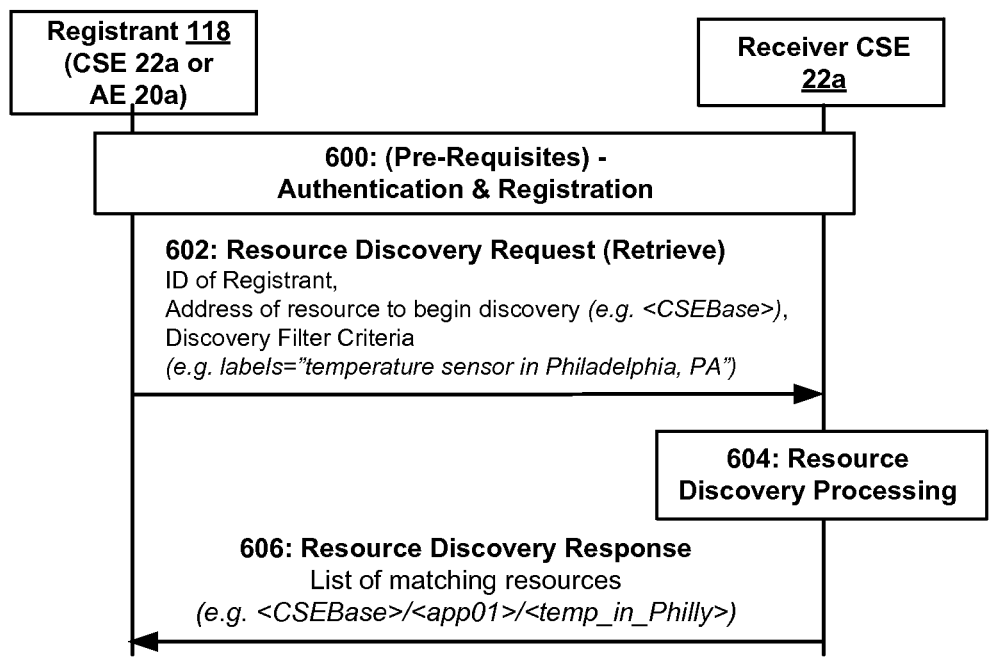
FIG. 6 is a call flow that illustrates an example of oneM2M resource discovery.

Referring now to FIG. 6, oneM2M supports resource discovery mechanisms that can be used by a registrant 118 to query and find resources or services hosted by a receiver CSE 22a. The registrant 118 may include, for example, a CSE 22a or an AE 20a. As shown in the example depicted in FIG. 6, oneM2M resource discovery uses a retrieve request that is originated by the registrant 118 (who was successfully authenticated and registered to a CSE at 600). Still referring to FIG. 6, in accordance with the illustrated example, at 602, the discovery request is sent to the receiver CSE 22a. The example discovery request includes an identity (ID) of the registrant 118, an address of the resource where the discovery operation is to begin (e.g., <CSE-Base>), and discovery filter criteria (fc). The filter criteria describe the rules that the CSE 22a uses to perform the resource discovery. For example, the rules may indicate one or more resource types, a creation time, and one or more labels that match. An example list of oneM2M filter criteria is shown in Table 1 below. At 604, the CSE 22a uses the filter criteria when processing and searching for resources that match the discovery request. Accordingly, such resources may be referred to as matching resources. A match occurs when the service layer 22a finds a resource that matches or meets the filter criteria that are specified in the request that that was sent at 602, and when the registrant 118 has sufficient permissions to access the discovered resource. At 606, in accordance with illustrated example, one or more matching resources are discovered, and thus the receiver CSE 22a sends a successful response to the registrant 118. A successful response may indicate a list of the matched resources.

By way of example, still referring to FIG. 6, the CSE 22a can support a labels attribute for each of the resources that it hosts. The labels attribute can store search string information, such as a "temperature sensor in Philadelphia, PA." for example. Based on the labels attribute, the registrant 118 can issue a discovery request (at 602) to the CSE 22a that includes query criteria such as, for example, "labels=temperature sensor in Philadelphia, PA." At 604, the CSE 22a can then query and find any resources with this matching labels attribute. If any resources exist, the CSE 22a can include discovery information (e.g., an address) for these resources within the response it returns to the registrant 118 at 606.

TABLE 1

| Condition tag | Multiplicity | Matching condition |
| --- | --- | --- |
| createdBefore | 0..1 | The creationTime attribute of the resource is chronologically before the specified value. |
| createdAfter | 0..1 | The creation Time attribute of the resource is chronologically after the specified value. |
| modifiedSince | 0..1 | The lastModifiedTime attribute of the resource is chronologically after the specified value. |
| unmodifiedSince | 0..1 | The lastModifiedTime attribute of the resource is chronologically before the specified value. |
| stateTagSmaller | 0..1 | The stateTag attribute of the resource is smaller than the specified value. |
| stateTagBigger | 0..1 | The stateTag attribute of the resource is bigger than the specified value. |
| expireBefore | 0..1 | The expiration Time attribute of the resource is chronologically before the specified value. |

TABLE 1-continued

| Condition tag | Multiplicity | Matching condition |
|---|---|---|
| expireAfter | 0..1 | The expiration Time attribute of the resource is chronologically after the specified value. |
| Labels | 0..n | The labels attributes of the resource matches the specified value. |
| resourceType | 0..n | The resourceType attribute of the resource is the same as the specified value. It also allows discriminating between normal and announced resources. |
| sizeAbove | 0..1 | The contentSize attribute of the <contentInstance> resource is equal to or greater than the specified value. |
| sizeBelow | 0..1 | The contentSize attribute of the <contentInstance> resource is smaller than the specified value. |
| contentType | 0..n | The typeOfContent attribute of the <contentInstance> resource matches the specified value. |
| Limit | 0..1 | Limitation the number of matching resources to the specified value. |
| Attribute | 0..n | This is an attribute of resource types (clause 9.6). Therefore, a real tag name is variable and depends on its usage. E.g., creator of container resource type can be used as a filter criteria tag as "creator = Sam". |
| filterUsage | 0..1 | Indicates how the filter criteria is used. E.g., if this parameter is not provided, the Retrieve operation is for generic retrieve operation. If filterUsage is provided, the Retrieve operation is for resource <discovery> (clause 10.2.6). |

Figure 7:
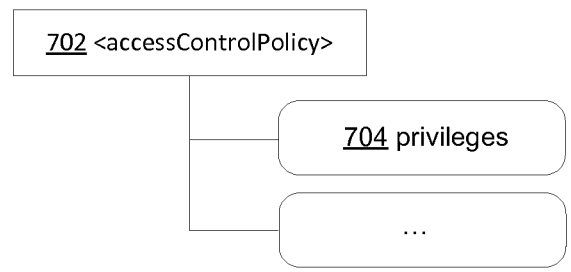
FIG. 7 illustrates an example of an oneM2M access controls.

By way of further background, oneM2M access control mechanisms are used to authorize access for authenticated service layer registrants to resources and/or services hosted by a CSE. For example, before a given registrant is authorized to access resources or services hosted by a given CSE, the registrant is authenticated by the CSE and registered to the CSE. After authentication and registration, the registrant is authorized to access the resources or services. Authorization may include allowing authenticated registrants to access resources and services hosted in a CSE based on provisioned access control policies 702 (or permissions) associated with each individual registrant. These access control policies 702 may be maintained within a oneM2M defined <accessControlPolicy> resource type that supports a 'privileges' attribute 704, as shown in FIG. 7. The privileges attribute 704 can be configured with access control rules (e.g., policies) that define which authenticated service layer registrants are authorized to access resources associated with the <accessControlPolicy> resource.

Figure 8:
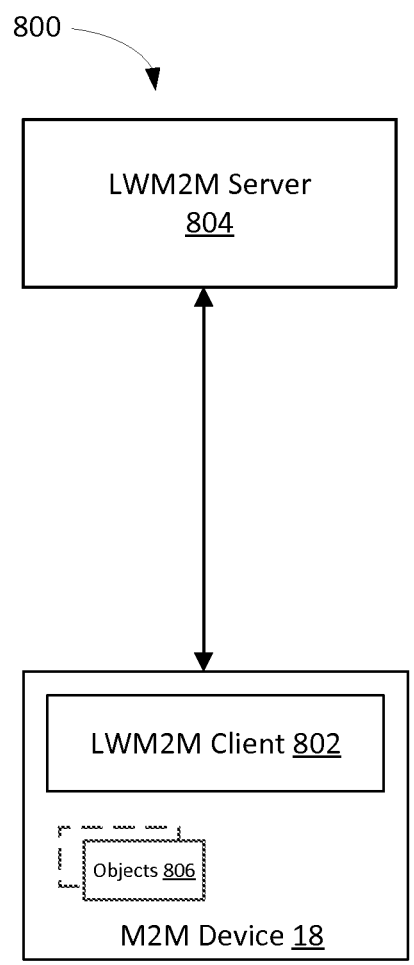
FIG. 8 is a block diagram that illustrates an example of an OMA LWM2M architecture.

Referring now to FIG. 8, OMA LWM2M Resource Discovery is now introduced. OMA LWM2M defines a service layer to enable lightweight application-layer communication between a LWM2M client 802 that is hosted on a given M2M device 18, and a LWM2M server 804 that can be hosted on various nodes, such as an M2M gateway or server for example. An example OMA LWM2M architecture 800 is shown in FIG. 8. One feature supported by OMA LWM2M is resource discovery. Resource discovery may be used by the LWM2M server 804 to discover the resources, which can also be referred to as objects 806, supported by the LWM2M client 802. Such discovery may be performed in a similar manner as oneM2M resource discovery is performed. For example, LWM2M discovery may include a retrieve operation (e.g., CoAP GET) with optional filter criteria, as described above.

Figure 9:
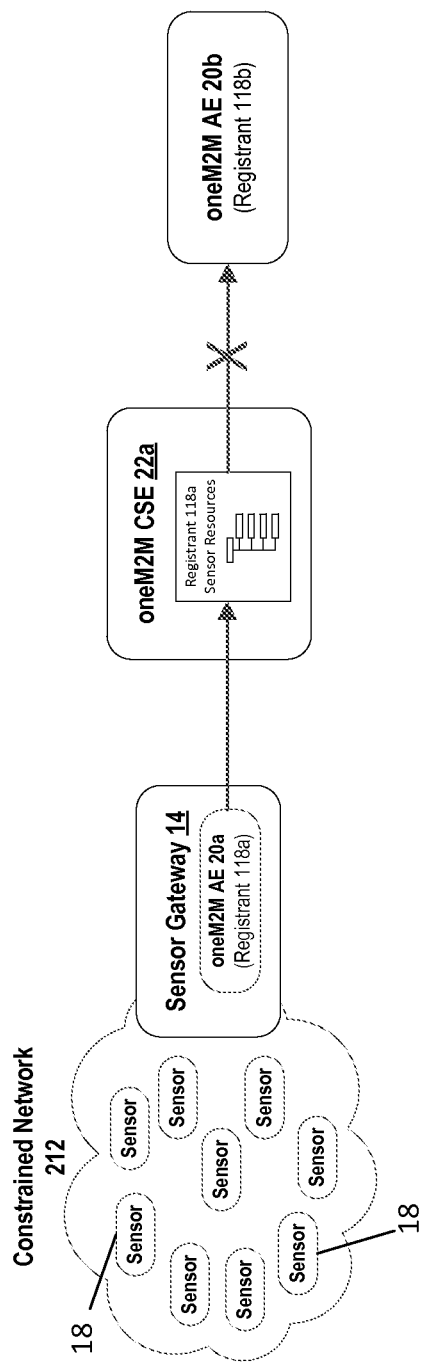
FIG. 9 illustrates an example system that lacks permission-based resource discovery.

Referring now to FIG. 9, it is recognized herein that the existing oneM2M defined resource discovery mechanisms allow a given registrant 118 to query and find resources hosted by a given CSE 22a only when the registrant 118 is authorized to access the resource. Authorization to access a resource is granted by the owner of the resource, which is typically another registrant 118 of the CSE 22a. The owner of the resource grants authorization by updating the corresponding access control policies of the resource. For example, the owner may update an access control list. Thus, only when authorization is given to a registrant can the registrant discover and subsequently access the resource. It is further recognized herein that the above-described resource discovery mechanism is problematic at least because it requires resource owners to know in advance which registrants are going to try to discover and access their resources. If a resource owner does not know that a particular registrant will try to access a particular resource owned by the resource owner, and the registrant attempts to discover the resource, the resource will not be discovered and accessed by the registrant. Thus, the resource owner may lose various opportunities, such as income opportunities for example. Further, a registrant may not be able to function as desired because the registrant might not be able to discover and access a particular resource.

It is also recognized herein that existing oneM2M resource discovery mechanisms do not provide feedback to registrants regarding the permissions that the registrants lack. Such permissions may be required for a registrant to discover and access CSE resources that the registrant desires. Example feedback includes, presented without limitation, a type of permission that a registrant lacks for accessing a specific resource, contact information of a particular resource owner, etc. It is recognized herein that the lack of such feedback is problematic at least because it may prevent registrants from detecting if and when they lack the proper authorization to discover and access a particular resource. The lack of feedback may prevent registrants from taking corrective action, such as requesting and obtaining the proper authorization required from a resource owner for example.

The example problems described above are further described with reference to FIG. 9. As shown, a first AE 20a is hosted on a sensor gateway 14. The sensor gateway communicates with various M2M devices 18 that are configured as sensors in an access network 212, for instance a constrained network. The first AE 20a is authenticated by and registered to a oneM2M CSE 22a. Thus, the first AE 20a may also be referred to as a first registrant 118a. In accordance with the illustrated example, the first AE 20a stores its sensor readings within resources hosted by the CSE 22a. A second AE 20b is authenticated by and registered to the CSE 22a to which the first AE 20a is registered. Thus, the second AE 20b may also be referred to as a second registrant 118b. In the example, the second AE 20b is interested in discovering and accessing sensors that happen to be the same type as those in the constrained network 212 that are supported by the first AE 20a. But the first registrant 118a has no prior knowledge or awareness of the second registrant 118b. Thus, in the example, the second registrant 118b is unable to discover and access the sensor resources in the CSE 22a at least because the second registrant 118b is not authorized to do so by the first registrant 118a. Stated another way, the first AE 20a cannot grant the second AE 20b permissions to discover and access the sensor resources. Thus, in the example, the second AE 20b is unable to discover and access the sensor resources owned by the first AE 20a.

As recognized herein, yet another problem with the existing oneM2M resource discovery mechanisms is that a registrant cannot specify the type of operations that the registrant intends to perform on a discovered resource or service (e.g., Create, Retrieve, Update, Delete, Subscribe, Notify, etc.). Further, using existing mechanisms, it is recognized herein that a registrant cannot specify the role with which the registrant intends to access the discovered resource or service (e.g., user or administrator). Further still, using existing mechanisms, it is recognized herein that a registrant cannot specify a location from which the registrant intends to access the resource or service. Further still, using existing mechanisms, it is recognized herein that a registrant cannot identify a subscription plan with which the registrant intends to use to access the resources or services (e.g., in the case that the registrant has multiple plans). Without being able to indicate various types of information, such as the example information mentioned above, a CSE may lack proper awareness of the context in which the registrant intends to access a discovered resource or service when processing a resource discovery request. Without proper context, the CSE may be unable to determine whether a registrant has the proper permissions to access the resource or service in the way that the registrant intends to access the resource or services. Thus, for example, a registrant may fail in accessing resources or services due to inadequate permissions when the registrant attempts to access discovered resources or services. Such failures may be avoided or curtailed, for example, if the CSE can take into account various context information during the discovery process, and use the context information to further qualify the discovery results that are returned to a registrant.

In accordance with an example embodiment, one or more registrants 118 may issue permission-based resource or service discovery requests to a CSE 22a. The requests may include permission-specific parameters and/or filter criteria. Upon receiving a request, the CSE 22a can process the request. The CSE 20a, as further described below, may return permission-based discovery results to a particular registrant 118. The discovery results may include a list of one or more individual resources or services that meet the specified discovery criteria contained in the discovery request. The discovery results may include permission related information that corresponds to the one or more resources or services. The permission related information can be used by the registrant to determine which of the discovered resources or services the registrant has adequate permissions to access. The registrant may also determine which of the discovered resources or services the registrant has inadequate permissions to access. Thus, based on permission-related information, a registrant of the service layer 22 can decide which actions to take. For example, the registrant can identify resources or services which it does not or does have adequate permissions to access.

For convenience, the example embodiments are generally described herein in the context of a oneM2M-based service layer (CSE). It will be understood that embodiments are not limited to oneM2M, and embodiments may be implemented using various service layers of alternative architectures, such as OMA LWM2M for example.

Figure 10:
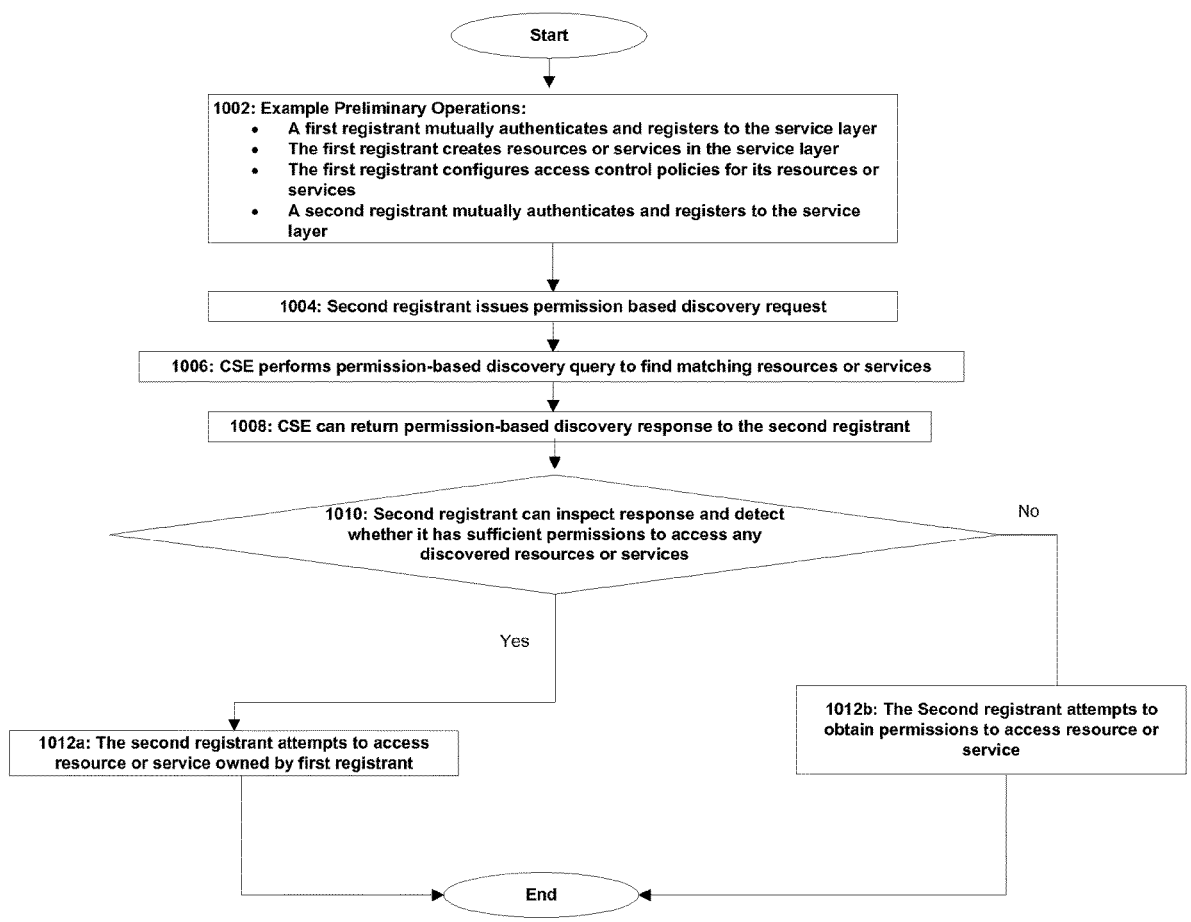
FIG. 10 is a flow diagram that illustrates an example of permission-based resource and service discovery in accordance with an example embodiment.

Referring now to FIG. 10, an example method that can be performed using a CSE 22a is depicted. At 1002, in accordance with the illustrated embodiment, preliminary operations are performed so that a plurality of registrants 118 are registered to the CSE 22a. For example, a first registrant 118a of the plurality of registrants 118 may mutually authenticate with the CSE 22a, and the first registrant 118a may register to the CSE 22a. The first registrant 118a may create one or more resources or services which are hosted within the CSE 22a. Alternatively, or additionally, the first registrant 118a may create links to the one or more resources or services that are hosted external to the CSE 22a. The CSE 22a may manage the access control policies for such external resources or services. The first registrant 118a may configure access controls corresponding to the resources or services with a list of one or more access control policies that the CSE 22a can use to authorize access to the resources or services. A second registrant 118b of the plurality of registrants 118 may mutually authenticate with the CSE 22a, and the second 118b may register to the CSE 22a.

Still referring to FIG. 10, in accordance with the illustrated embodiment, at 1004, after the second registrant 118b is authenticated and registered to the CSE 22a for example, the second registrant 118b can query the CSE 22a in a permission based manner. For example, the second registrant 118b may query the CSE 22a to discover resources or services that the second registrant 118b desires. Such a query may be referred to as a discovery request. The desired resources or services may be owned by the first registrant 118a. The second registrant 118a may desire to perform operations on the desired resources or services. Within the discovery request, the second registrant 118 can include various information that allows the CSE 22a to qualify a discovery response based on permissions. The discovery request may be sent by the second registrant 118b based on a trigger. For example, the discovery request may be triggered when the second registrant is not pre-provisioned with information (e.g., URI and permissions) associated with desired resources or services. Thus, the second registrant may dynamically discover this information via permission based discovery.

In one embodiment, the CSE 22a can allow a given registrant to optionally include permission-based filter criteria in a discovery request. The filter criteria can be used by the CSE 22a to qualify whether or not a resource or service matches and is included in a discovery response. For example, Table 2 below defines additional oneM2M discovery filter criteria or conditions, which also can be referred to generally as discovery parameters or discovery context, that can be used to support permission-based discovery functionality defined in this disclosure. Permission-based discovery requests can include the example discovery context listed in Table 2. It will be understood that alternative discovery context may be included in discovery requests as desired. The defined discovery context of Table 2 may be used with existing oneM2M discovery filter criteria to realize permission-based discovery. The tags of Table 2 can be included in the existing oneM2M filter criteria request parameter. Alternatively, or additionally, the tags of Table 2 can be included in an additional permission-based filter criteria request parameter. In an example embodiment, a user can use a user interface to configure a given registrant to specify which permission-based filter criteria, such as the criteria in Table 2 for example, should be included in a permission based-discovery request that is sent by the given registrant. Thus, a given registrant may be configured, via a user interface, such that the context of a discovery request is specified by a user of the registrant.

TABLE 2

| Examples of Permission-based Filter Criteria Tags | Description |
|---|---|
| permissions | Used to instruct the CSE to include resources or services in the discovery response that:<br>1) the registrant has permissions to access, or<br>2) the registrant does NOT have permissions to access<br>E.g. permissions = granted \| denied |
| operations | Used to instruct the CSE to include resources or services in the discovery response on which the registrant can perform the specified operations.<br>E.g. operations = C\|R\|U\|D\|S\|N<br>Where C = Create, R = Retrieve, U = Update, D = Delete, S = Subscribe, N = Notify |
| roles | Used to instruct the CSE to include resources or services in the discovery response which the registrant can access via the specified roles.<br>E.g. roles = user\|administrator |
| locations | Used to instruct the CSE to include resources or services in the discovery response which the registrant can access from the specified locations.<br>E.g. locations = home\|mobile<br>E.g. locations = <ip address1>\|<ip address2> |
| subscriptions | Used to instruct the CSE to include resources or services in the discovery response which the registrant can access using the specified subscription plan.<br>E.g. subscription = planA |

In another example embodiment, additional oneM2M discovery request parameters can be used instead of or in addition to the permission-based filter criteria described above in Table 2. Permission-based discovery requests can include the example discovery parameters listed in Table 3, which can also be referred to generally as discovery context. It will be understood that alternative discovery parameters may be included in discovery requests as desired. Further, the example discovery parameters listed in Table 3 may be used with existing oneM2M discovery request parameters to realize permission-based discovery. In an example embodiment, a user can use a user interface to configure a given registrant to specify which permission-based discovery parameters, such as the parameters listed in Table 3 for example, should be included in a permission based-discovery request that is sent by the given registrant.

TABLE 3

| Example Permission-based Discovery Request Parameters | Description |
|---|---|
| targetedOperations | The operations (e.g., create, retrieve, update, delete, read, write, subscribe, etc.) that the registrant intends to perform on the discovered resource or service hosted by the CSE. |
| targetedRoles | The roles (e.g., user, administrator, etc.) the registrant intends to be acting as when performs the targeted operations on the discovered resource or service. |
| targetedLocation | The location (geo, network, indoor, etc) the registrant intends to access the discovered resources from. |
| currentSubscription | The type or level of business relationship (e.g., type of subscriber, subscription level, etc.) that the registrant currently has with the CSE's owner or provider. This can include subscription-based information such as the fees or terms that are part of the registrant's current subscription. |
| newSubscription | The type or level of business relationship (e.g., type of subscriber, subscription level, etc.) that the registrant is willing to upgrade to or enter into in order to access the resource or service. This can include subscription-based information such as the fees or terms that a registrant is willing to agree to in order to access a resource or service. |

Referring again to FIG. 10, in accordance with the illustrated embodiment, at 1006, upon receiving the discovery request, the CSE 22*a* can determine that the discovery request is a permission-based discovery request. For example, the CSE 22*a* may detect the presence of one or more permission-based filter criteria or request parameters, referred to collectively as discovery context. Based on detecting a permission-based discovery request, the CSE 22*a* can process the discovery request to determine resources or services match the request. For example, the CSE 22*a* may compare filter criteria indicated in the discovery request to corresponding attributes associated with resources or services that the CSE 22*a* hosts. By way of further example, the CSE 22*a* may compare request parameters indicated in the discovery request to corresponding attributes associated with resources or services that the CSE 22*a* hosts. Further, the CSE 22*a* can compare filter criteria or attributes to corresponding attributes associated with resources or services to which the CSE 22*a* is linked. In some cases, if the resources or services that are desired by the second registrant 118*b* are found (discovered) by the CSE 22*a*, the CSE 22*a* may check a list of one or more permissions that are associated with the desired resources or services to determine whether the discovered resources or services are accessible to the second registrant 118*b*, which can also be referred to as the requesting registrant 118*b*. The permissions may be maintained by the CSE 22*a*. It will be understood that any of the described methods for defining permissions can be used individually or together in any appropriate combination.

In some cases, permissions may be implemented as an Access Control List (ACL). If the permissions are implemented as an ACL, the CSE 22*a* can search the ACL using an identity (ID) of the requesting registrant 118*b* that is associated with the CSE 22*a*. The CSE 22*a* can search the ACL to determine if any permissions exist for the registrant 118*b*. If permissions that are associated with the registrant 118*b* are found, the CSE 22*a* can compare the permissions to an operation that the registrant 118*b* desires to perform on the desired resource or service. If the permissions allow the desired operation to be performed, for example, the CSE 22*a* can include the desired resource or service in the discovery results. If the permissions do not allow the desired operation, or no permissions associated with the requesting registrant 118*b* exist, the CSE 22*a* can omit the desired resource or service from the discovery results. In accordance with an example embodiment, the CSE 22*a* can optionally include information in a discovery response that notifies the registrant 118*b* that a matching resource or service was discovered (found), but the registrant 118*b* currently lacks sufficient permissions to access the discovered resource or service. Further, the CSE 22*a* may specify which permissions the requesting registrant 118*b* lacks, as described further with respect to 1008 in FIG. 10.

In another example, permissions are implemented as Role Based Access Controls. For example, the CSE 22*a* can compare a role that the requesting registrant 118*b* has indicated will be assumed to perform a desired operation on/to the discovered resource or service. If the desired operation is permitted for the specified role, the CSE 22*a* may include the resource or service in the discovery results. If the operation is not permitted for the specified role, or if there are no permissions that exist for the specified role, the CSE can omit the resource or service from the discovery results. In an example embodiment, the CSE 22*a* can optionally include information in the discovery response that notifies the requesting registrant 118*b* that a matching resource or service was discovered (found), but the registrant 118*b* currently cannot access the discovered resource or service using the specified role. Further, the CSE 22*a* may specify which role is required for the registrant 118*b* to access the desired resource or service.

In yet another example embodiment, permissions are implemented as Subscription Based Access Controls. When the permissions are implemented as Subscription Based Access Controls, the CSE 22*a* may compare a type of subscription that the requesting registrant 118*b* has to a type of subscription that is required to perform the desired operation on the desired resource or service. If the desired operation is permitted for the specified subscription type, the CSE 22*a* can include the desired resource or service in the discovery results. If the operation is not permitted for the specified subscription type, or if there are no permissions that exist for the specified subscription type, the CSE 22*a* can omit the desired resource or service from the discovery results. Further, the CSE 22*a* may specify which type of subscription to the CSE 22*a* is required to access the desired resources or services.

With continuing reference to FIG. 10, in accordance with the illustrated embodiment, at 1008, the CSE 22*a* returns a permission-based discovery response to the second registrant 118*b*. In the discovery response, the CSE 22*a* can inform the second registrant 118*a* of which permissions the second registrant has and/or lacks to access each of one or more of the discovered resources or services. For example, at 1006, the CSE 22*a* can include a description of the second registrant's permissions (or lack thereof) to access one or more resources or services found during discovery. Such permission information can be included by the CSE 22*a* in the discovery response that the CSE 22*a* sends to the second registrant 118*b*. Based on permission information, the second registrant 118*b* can determine which of the discovered resources or services (if any) the second registrant 118*b* has sufficient permissions such the second registrant can perform desired operations on the resources or services. Table 4 below defines additional oneM2M discovery response parameters that can be used to indicate various permission information to registrants. Thus, the example discovery response parameters in Table 4 may be used to enable permission-based resource discovery functionality described above. It will be understood that alternative discovery response parameters may be included in discovery responses as desired, and thus discovery responses are not limited to the permissioned-discovery response parameters listed in Table 4. In an example embodiment, a user interface associated with the second registrant 118*b* can display the permission-based discovery results, such as the parameters listed in Table 4 for example, that are contained in a given response from the CSE 22*a*. Thus, based on the response, the user, via the user interface, may select one or more resources or services that the user has permission to access. For example, the result indicated by a discovery response may be displayed by a user interface such that a user of the registrant may select one or more resources, via the user interface, that the registrant has permission to access.

TABLE 4

| Example Permission-based Discovery Response Parameters | Description |
| --- | --- |
| grantedResources | The resources hosted in the CSE that match the discovery filterCriteria specified in the discovery request which the registrant is allowed to perform grantedOperations on. |
| deniedResources | The resources hosted in the CSE that match the discovery filterCriteria specified in the discovery request, but the registrant is NOT allowed to access due to a lack of permissions |
| grantedServices | The services hosted in the CSE that match the discovery filterCriteria specified in the discovery request which the registrant is allowed to perform grantedOperations on. |
| deniedServices | The services hosted in the CSE that match the discovery filterCriteria specified in the discovery request, but the registrant is NOT allowed to access due to a lack of permissions |
| grantedOperations | Based on the targetedOperations specified in the discovery request, these are the operations (e.g., create, retrieve, update, delete, read, write, subscribe, etc.) that the registrant is allowed to perform on the discovered grantedResources or grantedServices hosted by the CSE. |
| deniedOperations | Based on the targetedOperations specified in the discovery request, these are the operations (e.g. create, retrieve, update, delete, read, write, subscribe, etc.) that the registrant is NOT allowed to perform on the discovered grantedResources or grantedServices hosted by the CSE. |
| grantedRoles | Based on the targetedRoles specified in the discovery request, these are the roles (e.g. user, administrator, etc.) the registrant has been granted to perform grantedOperations on the grantedResources or grantedServices. |
| deniedRoles | Based on the targetedRoles specified in the discovery request, these are the roles (e.g. user, administrator, etc.) the registrant has been denied to use when accessing the grantedResources or grantedServices. |
| grantedLocation | Based on the targetedLocations specified in the discovery request, these are the locations (geo, network, indoor, etc) the registrant has been granted to access the discovered resources from. |
| deniedLocation | Based on the targetedLocations specified in the discovery request, these are the locations (geo, network, indoor, etc) the registrant has been denied to access the discovered resources from. |
| requiredSubscription | The type or level of business relationship (i.e., type of subscriber, subscription level, etc.) that the registrant must have with the CSE's owner or provider in order to access the grantedResources or grantedServices. |

Still referring to FIG. 10, upon receiving the permission aware discovery response from the CSE 22a, the second registrant 118b can detect whether or not any resources or services exist in the CSE 22a for which it has sufficient permissions to perform a desired operation on. For example, the registrant 118b may inspect one or more, for instance each, of the permission-based discovery response parameters listed in Table 4 above to determine whether any of the discovered resources or services are accessible to the registrant 118b. If the registrant 118b is permitted to access at least one of the desired and discovered resources and services, the process may proceed to 1012a, where the second registrant 118b accesses the resource or service, which may be owned by the first registrant 118a. Alternatively, if the registrant 118b is not permitted to access at least one of the desired and discovered resources and services, the process may proceed to 1012b, where the registrant 118b can try to obtain the permissions that are necessary to access the discovered and desired resource or services. For example, the registrant 118b may use information provided in the permission-based discovery response (e.g., resource or service owner's address, permissions it is lacking, etc.) to obtain necessary permissions.

Thus, as described above, a system may include a registrant, for instance the second registrant 118b, that communicates with a network node that hosts the service layer 22, which can be referred to as the CSE 22a. The network node may receive a discovery request for a resource from the registrant. The requested resource may be a resource that the registrant is not authorized to access. The discovery request may include various context. For example, the context of the discovery request may be indicative of at least one of an operation that the registrant intends to perform on the resource, a role that the registrant intends to assume if the registrant accesses the resource, a location in which the registrant intends to access the resource, and a subscription plan that the registrant intends to use if the registrant accesses the resource. Based on the context of the discovery request, the network node may determine whether one or more resources at the service layer satisfy the discovery request. The network node may send a discovery response to the registrant, wherein the discovery response indicates a result of the determination of whether the one or more resources satisfy the discovery request. When the one or more resources do not satisfy the discovery request, the network node may send at least one resource to the registrant such that the registrant can obtain permission to access the at least one resource. When the one or more resources satisfy the discovery request, the network node may send the one or more resources to the registrant.

Figure 13C:
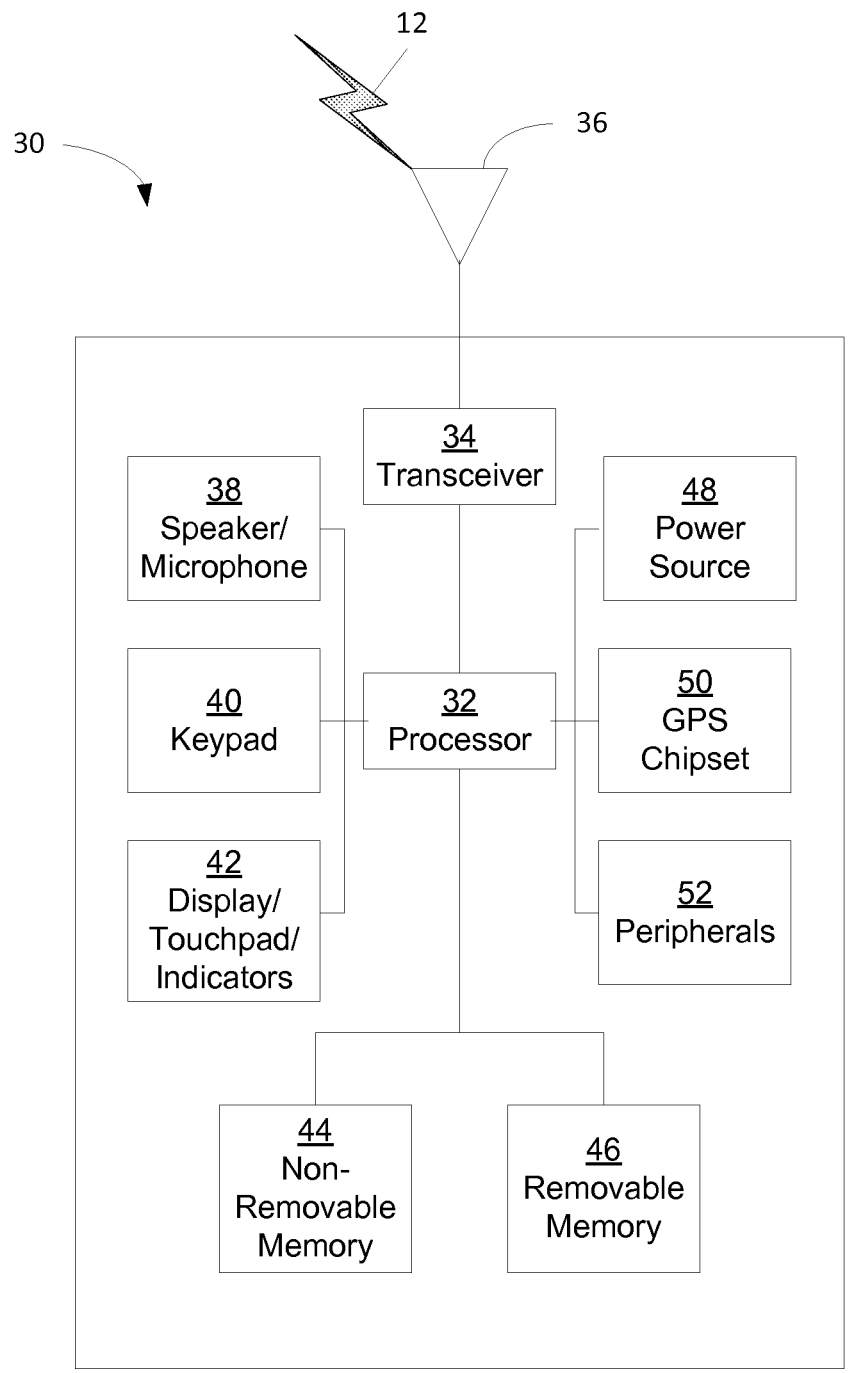
FIG. 13C is a system diagram of an example M2M/IoT terminal or gateway device that may be used within the communications system illustrated in FIG. 13A.
Figure 13D:
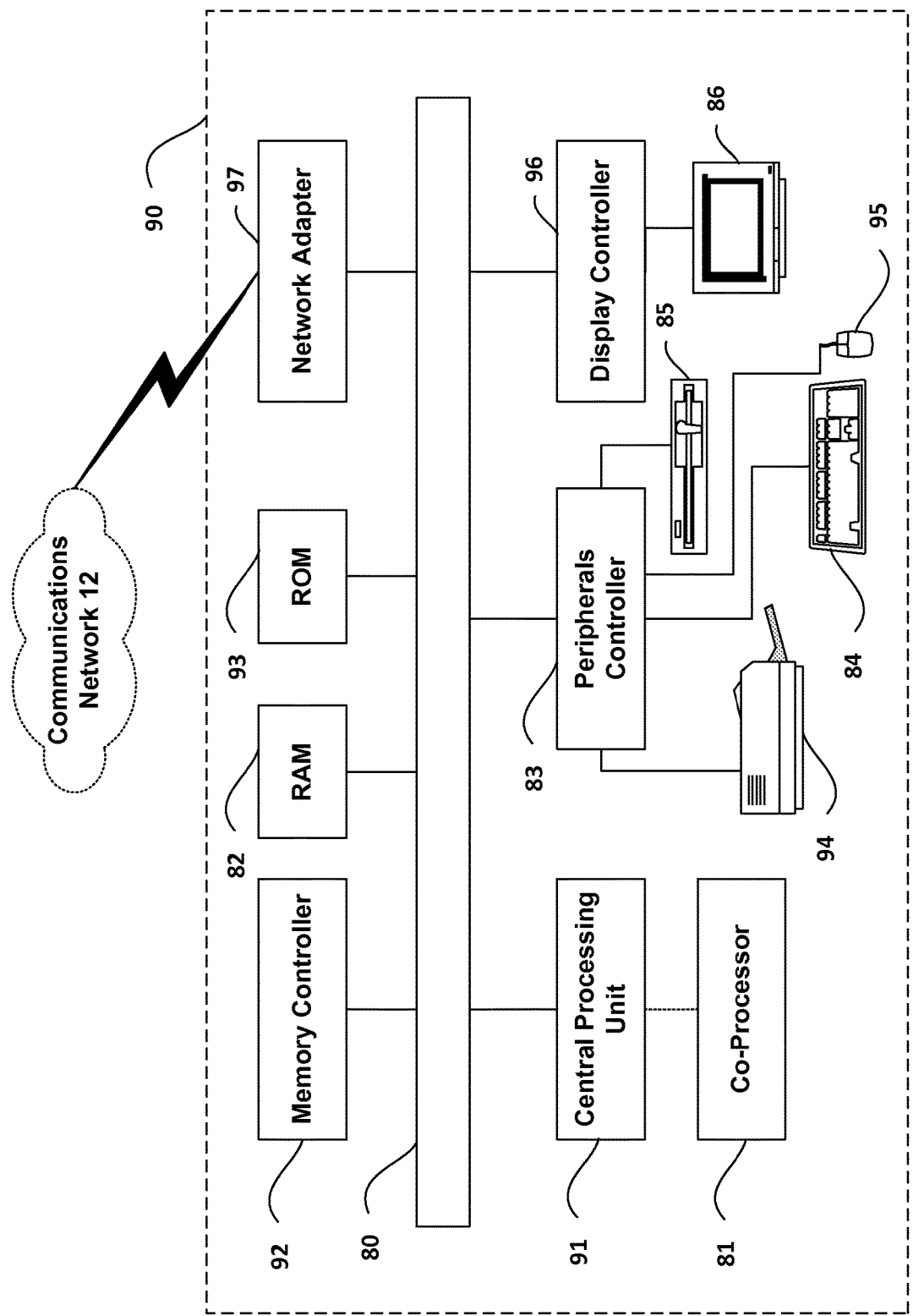
FIG. 13D is a block diagram of an example computing system in which aspects of the communication system of FIG. 13A may be embodied.

It will be understood that the entities performing the steps illustrated in FIG. 6 are logical entities that may be implemented in the form of software (e.g., computer-executable instructions) stored in a memory of, and executing on a processor of, a device, server, or computer system such as those illustrated in FIG. 13C or FIG. 13D. That is, the method(s) illustrated in FIG. 6 may be implemented in the form of software (e.g., computer-executable instructions) stored in a memory of a computing device, such as the device or computer system illustrated in FIGS. 13C or 13D, which computer-executable instructions, when executed by a processor of the computing device, perform the steps illustrated in FIG. 6.

As described above, a registrant that is authenticated by a service layer (an authenticated registrant) can initiate permission-based oneM2M resource or service discovery by including one or more permission-based filter criteria, such as the criteria listed in Table 2 for example, within the discovery request it issues to a given CSE 22*a*. Upon receiving the request, the CSE 22*a* may determine that the request is a permission-based discovery request by detecting the presence of one or more of the permission-based filter criteria. Based on the detection, the CSE 22*a* can process the discovery request to determine whether any matching resources or services exist by comparing the filter criteria and/or request parameters to corresponding attributes associated with of each the resources or services that the CSE 22*a* hosts. The CSE 22*a* can return the matching resource or services within the discovery response. In addition, the CSE can also include permission-based discovery response parameters, such as the discovery response parameters depicted in FIG. 4 for example, within the response. Matching resources or service and permission-based discovery response parameters can collectively be referred to as permission-based discovery results. The receiving registrant can parse the permission-based discovery results to determine if any resources or services match the filter criteria from the discovery request. Further, the receiving registrant can evaluate the permission-based discovery results to determine whether it has sufficient permissions to access the resources or services that match the filter criteria. If the receiving registrant does not have adequate permissions, the registrant can determine which permissions it is lacking from information contained in the discovery response.

Figure 11:
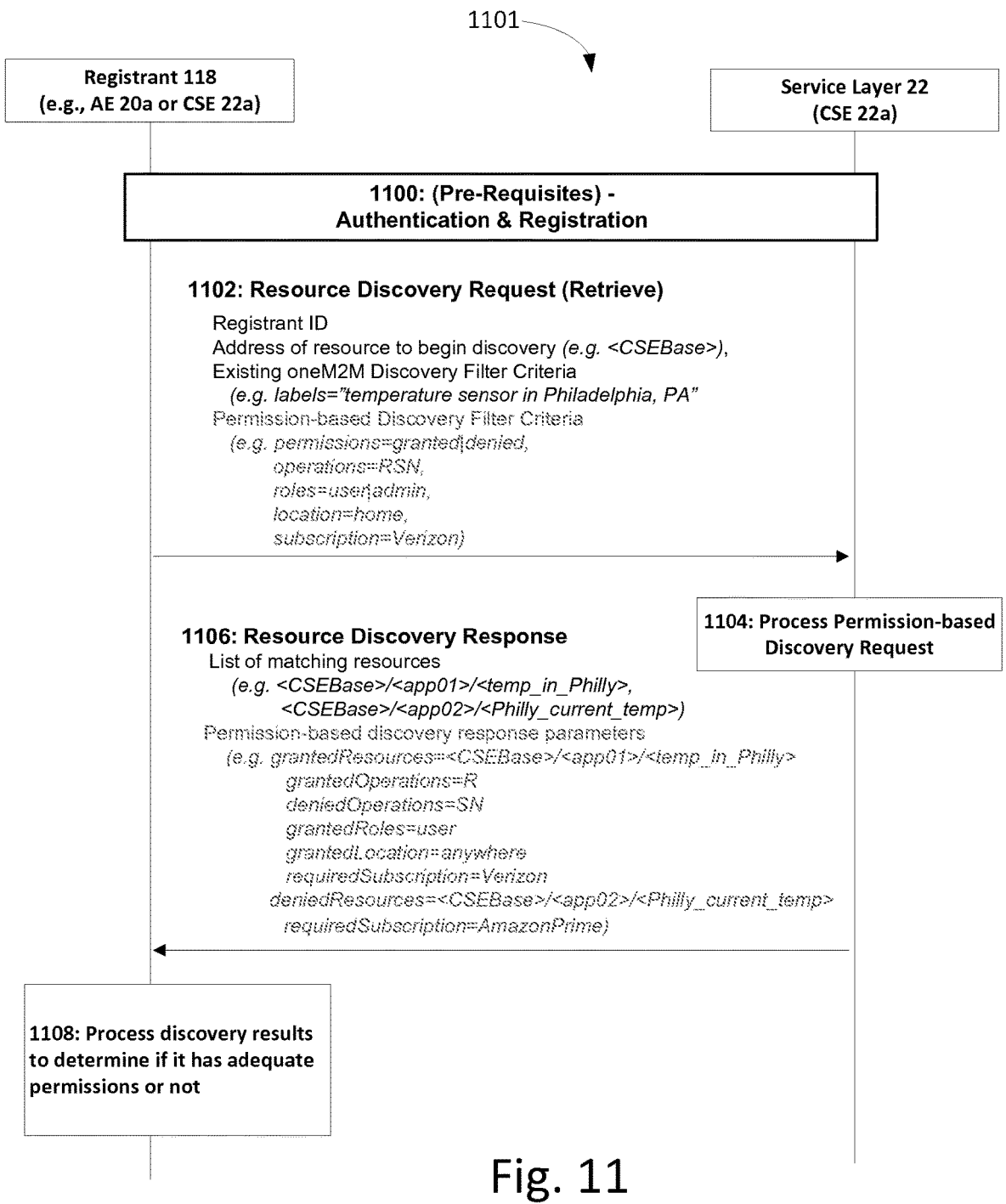
FIG. 11 is a call flow that illustrates an example of permission-based resource and service discovery using example permission-based discovery filter criteria.

FIG. 11 depicts an example of a permission-based discovery performed by an example system 1101 that includes an example registrant 118 (e.g., an AE 20*a* or CSE 22*a*) and an example service layer 22, such as a CSE 22*a* for example. It will be understood that the CSE 22*a* may be hosted on any appropriate network node. It will be appreciated that the example depicted in FIG. 11 is simplified to facilitate description of the disclosed subject matter and is not intended to limit the scope of this disclosure. Other devices, systems, and configurations may be used to implement the embodiments disclosed herein in addition to, or instead of, a system such as the system 1101, and all such embodiments are contemplated as within the scope of the present disclosure.

Referring to FIG. 11, at 1100, the registrant 118 is authenticated and registers to the CSE 22*a*. In some cases, before the registrant 118 can be authorized to access resources or services hosted in the CSE 22*a*, it must be successfully authenticated by the CSE 22*a* and registered to the CSE 22*a*. In some cases, existing oneM2M defined authentication, registration, and access control mechanisms are implemented at 1100. At 1102, in accordance with the illustrated embodiment, the registrant 118 sends a permission-based resource or service discovery request to the CSE 22*a*. Within this request, the registrant 118*a* may include existing oneM2M specified parameters, such as the registrant's ID, an address of the resource where the discovery operation is to begin (e.g., <CSEBase>), and discovery filter criteria (fc) (e.g., a label containing a search string of "temperature sensor in Philadelphia, PA") for example. As shown, the request may also include permission-based discovery filter criteria, such as the permission-based filter criteria described above. The criteria in the example illustrated in FIG. 11 indicate (specify) that the registrant 118 is interested in discovering resources that 1) the registrant 118 has permissions to access and resources that the registrant does not have permission to access (permissions=granted|denied); the registrant 118*b* can perform Retrieve, Subscription, and Notification operations on; 3) the registrant 118*b* can access with a role of 'admin'; 4) the registrant can access from 'home'; and 5) the registrant can access via its 'Verizon' subscription plan.

Still referring to the example depicted in FIG. 11, at 1104, the CSE 22*a* receives the permission-based discovery request and processes the information in the request that is provided by the registrant 118. The CSE 22*a* may compare the context information in the request with the types of resources and services hosted by the CSE 22*a*, and the access control policies associated with the resources and services hosted by the CSE 22*a*. The CSE 22*a* may use the registrant's ID to compare the access control policies of each resource it finds that meets the criteria. In the illustrated example, as a result of the processing at 1104 that is based on the ID of the registrant 118, the CSE 22*a* finds a first resource (<CSEBase>/<app01>/<temp_in_Philly) that meets the filter criteria (e.g., the labels) and the CSE 22*a* determines that the registrant has permission to access the first resource. Further, the CSE 22*a* determines that the first resource at least partially meets the permission-based request parameters. Additionally, in the illustrated example, the CSE 22*a* discovers a second resource that meets the filter criteria (e.g., labels), and the CSE 22*a* determines, based on the ID of the registrant 118, that the registrant 118 does not have permissions that are required to access the second resource (<CSEBase>/<app02>/<Philly_current_temp).

At 1106, in accordance with the illustrated example, the CSE 22*a* returns a response to the registrant 118. The response includes the permission-based service or resource discovery results. Thus, the response indicates the first resource that the registrant 118 has permission to access and the second resource that the registrant 118 does not have permission to access. As shown, the CSE 22*a* includes permission-based response parameters associated with the first resource and the second resource. The example permission-based response parameters indicate the following information to the registrant 118: 1) the registrant 118 has permissions to access CSEBase>/<app01>/<temp_in_Philly but not <CSEBase>/<app02>/<Philly_current_temp; 2) the registrant 118 has permissions to perform Retrieve operations to CSEBase>/<app01>/<temp_in_Philly but not subscription or notifications; 3) the registrant 118 can access CSEBase>/<app01>/<temp_in_Philly as a user but not an administrator; 4) the registrant 118 can access CSEBase>/<app01>/<temp_in_Philly from anywhere (not just from home); 5) the registrant 118 can access CSEBase>/<app01>/<temp_in_Philly using its Verizon subscription plan; and 5) the registrant 118 does NOT have permissions to access CSEBase>/<app02>/<Philly_current_temp> because the registrant 118 does not have an Amazon Prime subscription plan. It will be understood that the above permission-based response parameters are presented merely for purposes of example, and alternative response parameters may be used in embodiments described herein as desired.

At 1108, in accordance with the illustrated example, the registrant 118 processes the permission-based discovery response to determine whether any resources or services exist to which the registrant 118 has adequate permissions to access. In the illustrated example, the registrant 118 determines that it has access to the first resource (CSEBase>/<app01>/<temp_in_Philly). The registrant 118 also detects that it only has permission to perform Retrieve operations on the first resource, and thus the registrant 118 is not permitted to perform subscription or notification operations on the first resource. Based on the discovery response, the first registrant also detects that it must access the first resource via a user, and thus not an administrator. Based on the discovery response, a user of the registrant 118 may decide to setup an Amazon Prime account so that the registrant 118 can access the second resource (CSEBase>/<app01>/<temp_in_Philly).

Figure 12:
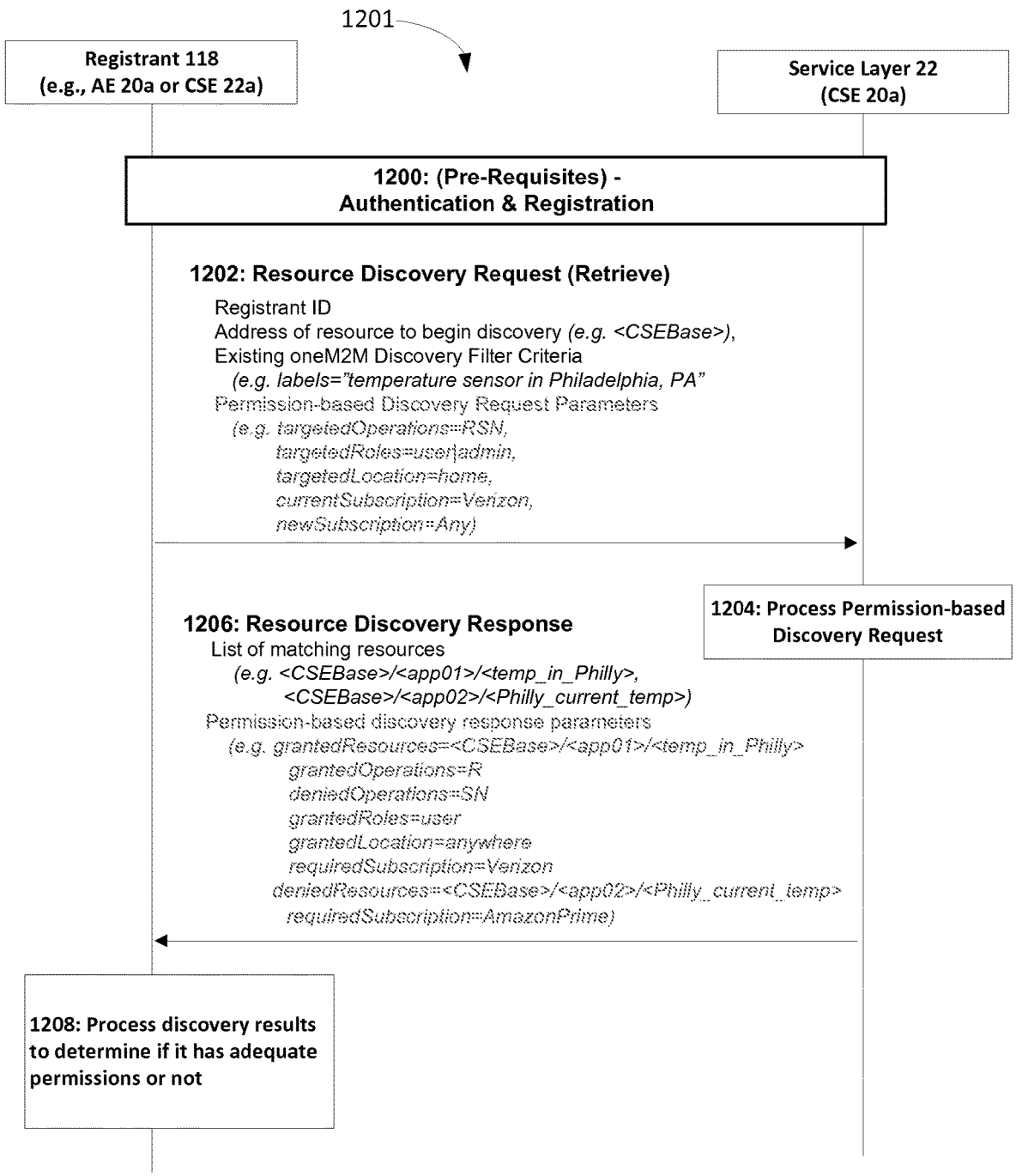
FIG. 12 is a call flow that illustrates another example of permission-based resource and service discovery using example permission-based discovery request parameters.

Referring now to FIG. 12, in an alternative embodiment, permission-based discovery information can be carried in oneM2M request parameters. As shown in FIG. 12, the permission-based filter criteria in FIG. 11 may be with oneM2M request parameters. An authenticated registrant can initiate permission-based oneM2M resource or service discovery by including one or more permission-based request parameters, such as the parameters listed in Table 3 for example, within the discovery request that the registrant issues to a CSE. Upon receiving the request, a CSE can detect that it is a permission-based discovery request by detecting the presence of these permission-based request parameters. Upon this detection, the CSE can process the request to determine whether any matching resources or services exist, for example, by comparing the filter criteria and request parameters against the corresponding attributes of each of its hosted resources or services. The CSE can return the matching resource or services within the discovery response. In addition, the CSE can also include permission-based discovery response parameters within the response, such as the response parameters listed in Table 4 for example. The registrant can parse the permission-based discovery results to determine whether any resources or services match the filter criteria and whether the registrant has sufficient permissions to access them. If permission is insufficient, the registrant can determine which permissions it lacks.

FIG. 12 depicts an example of a permission-based discovery performed by an example system 1201 that includes an example registrant 118 (e.g., an AE 20*a* or CSE 22*a*) and an example service layer 22, such as a CSE 22*a* for example. It will be understood that the CSE 22*a* may be hosted on any appropriate network node. It will be appreciated that the example depicted in FIG. 12 is simplified to facilitate description of the disclosed subject matter and is not intended to limit the scope of this disclosure. Other devices, systems, and configurations may be used to implement the embodiments disclosed herein in addition to, or instead of, a system such as the system 1201, and all such embodiments are contemplated as within the scope of the present disclosure.

Referring to FIG. 12, at 1100, the registrant 118 is authenticated and registers to the CSE 22*a*. In some cases, before the registrant 118 can be authorized to access resources or services hosted in the CSE 22*a*, it must be successfully authenticated by the CSE 22*a* and registered to the CSE 22*a*. In some cases, existing oneM2M defined authentication, registration, and access control mechanisms are implemented at 1100. At 1202, in accordance with the illustrated example, the registrant 118 sends a permission-based resource or service discovery request to the CSE 22*a*. Within this request, the registrant 118*a* may include existing oneM2M specified parameters, such as the registrant's ID, an address of the resource where the discovery operation is to begin (e.g., <CSEBase>), and discovery filter criteria (fc) (e.g., a label containing a search string of "temperature sensor in Philadelphia, PA") for example. As shown, the request may include contains permission-based discovery request parameters, such as the parameters listed in Table 3 for example. The parameters in the example illustrated in FIG. 12 indicate (specify) that the registrant 118 intends to: 1) perform Retrieve, Subscription and Notification operations on the discovered resource; 2) access the resources with a role as 'admin'; 3) access the resources from 'home'; and 4) access the resources via its 'Verizon' subscription plan.

Still referring to the example depicted in FIG. 12, at 1204, the CSE 22*a* receives the permission-based discovery request and processes the information in the request that is provided by the registrant 118. The CSE 22*a* may compare the context information in the request with the types of resources and services hosted by the CSE 22*a*, and the access control policies associated with the resources and services hosted by the CSE 22*a*. The CSE 22*a* may use the registrant's ID to compare the access control policies of each resource it finds that meets the criteria. In the illustrated example, as a result of the processing at 1204 that is based on the ID of the registrant 118, the CSE 22*a* finds a first resource (<CSEBase>/<app01>/<temp_in_Philly) that meets the filter criteria (e.g., the labels) and the CSE 22*a* determines that the registrant has permission to access the first resource. Further, the CSE 22*a* determines that the first resource at least partially meets the permission-based request parameters. Additionally, in the illustrated example, the CSE 22*a* discovers a second resource that meets the filter criteria (e.g., labels), and the CSE 22*a* determines, based on the ID of the registrant 118, that the registrant 118 does not have permissions that are required to access the second resource (<CSEBase>/<app02>/<Philly_current_temp).

At 1206, in accordance with the illustrated example, the CSE 22*a* returns a response to the registrant 118. The response includes the permission-based service or resource discovery results. Thus, the response indicates the first resource that the registrant 118 has permission to access and the second resource that the registrant 118 does not have permission to access. As shown, the CSE 22*a* includes permission-based response parameters associated with the first resource and the second resource. The example permission-based response parameters indicate the following information to the registrant 118: 1) the registrant 118 has permissions to access CSEBase>/<app01>/<temp_in_Philly but not <CSEBase>/<app02>/<Philly_current_temp; 2) the registrant 118 has permissions to perform Retrieve operations to CSEBase>/<app01>/<temp_in_Philly but not subscription or notifications; 3) the registrant 118 can access CSEBase>/<app01>/<temp_in_Philly as a user but not an administrator; 4) the registrant 118 can access CSEBase>/<app01>/<temp_in_Philly from anywhere (not just from home); 5) the registrant 118 can access CSEBase>/<app01>/<temp_in_Philly using its Verizon subscription plan; and 5) the registrant 118 does NOT have permissions to access CSEBase>/<app02>/<Philly_current_temp> because the registrant 118 does not have an Amazon Prime subscription plan. It will be understood that the above permission-based response parameters are presented merely for purposes of example, and alternative response parameters may be used in embodiments described herein as desired.

At 1208, in accordance with the illustrated example, the registrant 118 processes the permission-based discovery response to determine whether any resources or services exist to which the registrant 118 has adequate permissions to access. In the illustrated example, the registrant 118 determines that it has access to the first resource (CSEBase>/<app01>/<temp_in_Philly). The registrant 118 also detects that it only has permission to perform Retrieve operations on the first resource, and thus the registrant 118 is not permitted to perform subscription or notification operations on the first resource. Based on the discovery response, the first registrant also detects that it must access the first resource via a user, and thus not an administrator. Based on the discovery response, a user of the registrant 118 may decide to setup an Amazon Prime account so that the registrant 118 can access the second resource (CSEBase>/<app01>/<temp_in_Philly).

It will be understood that FIGS. 6-12 and the description related thereto illustrate various embodiments of methods and apparatuses for discovering services and resources. In these figures, various steps or operations are shown being performed by one or more nodes, devices, functions, or networks. It is understood that the nodes, devices, functions, or networks illustrated in these figures may represent logical entities in a communication network and may be implemented in the form of software (e.g., computer-executable instructions) stored in a memory of, and executing on a processor of, a node of such network, which may comprise one of the general architectures described herein (e.g., see FIGS. 13A and 13B). That is, the methods illustrated in FIGS. 6, 11, and 12 may be implemented in the form of software (e.g., computer-executable instructions) stored in a memory of a network node, such as for example the node or computer system illustrated in FIGS. 13C or 13D, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 13C and 13D, respectively) of the node under control of the processor of the node and the computer-executable instructions (e.g., software) that it executes.

As described above, a user can define various permission based resource or service discovery criteria, and corresponding results can be rendered (e.g., displayed) to the user. FIG. 14A shows an example graphical user interface 1400 for configuring permission-based discovery requests. As shown, a user can search based on targeted operations, targeted roles, targeted locations, a current subscription, a new subscription, or any appropriate combination thereof. It will be understood that other criteria may be displayed and selected as desired. After a user has entered the desired search criteria, the user may actuate a search option 1401 so that the search is performed. After a search is performed, a results interface, such as a results interface 1402 shown in FIG. 14B, may be rendered to the user. In accordance with the example, the results interface 1402 includes discovery results 1404*a* that are associated with granted permissions, and results 1404*b* that are associated with denied permissions. It will be understood that the results can be alternatively classified as desired. Furthermore, the illustrated results 1404*a* and 1404*b* may include, for example and without limitation, a list of resources, services, operations, roles, locations, and subscriptions, which are associated with the discovery criteria.

FIG. 13A is a diagram of an example machine-to-machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway or M2M service platform may be a component of the IoT/WoT as well as an IoT/WoT service layer, etc. Any of the devices, functions, nodes, or networks illustrated in any of FIGS. 6-12 may comprise a node of a communication system such as the one illustrated in FIGS. 13A-D.

As shown in FIG. 13A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 13A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles personal digital assistants, health and fitness monitors, lights, thermostats, appliances, garage doors and other actuator-based devices, security devices, and smart outlets.

Referring to FIG. 13B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Still Referring to FIG. 13B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Permission-based resource or service discovery described herein may be implemented as part of any service layer. Generally, a service layer (SL) defines a software middleware layer that supports value-added service capabilities through a set of application programming interfaces (APIs) and underlying networking interfaces. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented in a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device, or the like) having the general architecture illustrated in FIG. 13C or 13D described below.

Further, the methods and functionalities described herein may be implemented as part of an M2M network that uses a Service Oriented Architecture (SOA) and/or a resource-oriented architecture (ROA) to access services.

FIG. 14C is a block diagram of an example hardware/software architecture of a node of a network, such as one of the nodes, devices, functions, or networks illustrated in FIGS. 6-12 that may operate as an M2M server, gateway, device, or other node in an M2M network such as that illustrated in FIGS. 13A and 13B. As shown in FIG. 13C, the node 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. For example, the display/touchpad/indicator(s) may render the example GUIs 1400 and 1402 described above. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the methods related to permission-based discovery described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the Node 30 to operate in a wireless environment. The processor 32 may be coupled to the transceiver 34, which may be coupled to the transmit/receive element 36. While FIG. 13C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

As shown in FIG. 14C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 6, 11, and 12) and in the claims. While FIG. 13C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, devices, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 13C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 in response to whether the permission-based resource or service discovery in some of the embodiments described herein are successful or unsuccessful, or otherwise indicate the status of permission-based discovery. A graphical user interface, which may be shown on the display, may be layered on top of an API to allow a user to interactively establish and manage permission-based resource or service discovery described herein (e.g., see FIGS. 14A and 14B). For example, as described above with reference to FIG. 14A, a user can use the graphical user interface to configure a given registrant to specify which permission-based filter criteria, such as the criteria in Table 2 for example, should be included in a permission based-discovery request that is sent by the given registrant. Similarly, a user can use the graphical user interface to configure a given registrant to specify which permission-based discovery parameters, such as the parameters listed in Table 3 for example, should be included in a permission based-discovery request that is sent by the given registrant. By way of another example, the graphical user interface associated with a given registrant (e.g., see FIG. 14B) can display permission-based discovery results, such as the response parameters listed in Table 4 for example, that are contained in a given response from a given CSE. Thus, based on the response, a user, via the user interface, may select one or more resources or services such that the selected services or resources are accessed by the given registrant. The selected resources or services may be resources or services that the registrant has permission to access, as indicated by the discovery response.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 14D is a block diagram of an exemplary computing system 90 which may also be used to implement one or more nodes of a network, such as nodes, devices, functions, or networks illustrated in FIGS. 6-12, which may operate as an M2M server, gateway, device, or other node in an M2M network such as that illustrated in FIGS. 13A and 13B. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, which performs additional functions or assists CPU 91. CPU 91 and/or coprocessor 81 may receive, generate, and process data related to the disclosed systems and methods for discovery resources.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. A graphical user interface may be displayed by the display 86. For example, a user can use the graphical user interface to configure a given registrant to specify which permission-based filter criteria, such as the criteria in Table 2 for example, should be included in a permission based-discovery request that is sent by the given registrant. Similarly, a user can use the graphical user interface to configure a given registrant to specify which permission-based discovery parameters, such as the parameters listed in Table 3 for example, should be included in a permission based-discovery request that is sent by the given registrant. By way of another example, the graphic user interface associated with a given registrant can display permission-based discovery results, such as the response parameters listed in Table 4 for example, that are contained in a given response from a given CSE. Thus, based on the response, a user, via the user interface, may select one or more resources or services such that the select services are accessed by a given registrant. The selected resources or services may be resources or services that the registrant has permission to access, as indicated by the discovery response.

Further, computing system 90 may contain communication circuitry, such as for example a network adaptor 97 that may be used to connect computing system 90 to an external communications network, such as network 12 of FIG. 13A and FIG. 13B, to enable the computing system 90 to communicate with other nodes of the network. The communication circuitry, alone or in combination with the CPU 91, may be used to perform the transmitting and receiving steps described herein (e.g., in FIGS. 6, 11, and 12) and in the claims.

It will be understood that any of the methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A method performed by a network node that hosts a service layer and that communicates with a registrant, the method comprising:
    receiving a discovery request, from the registrant, for one or more resources, the discovery request including a parameter that specifies one or more operations that the registrant intends to perform on the discovered resources, wherein the parameter comprises an indication of permission-based filter criteria;
    based on the intended operations specified in the discovery request, determining whether one or more resources at the service layer have privileges defined that permit the registrant to perform the intended operations; and
    sending a discovery response to the registrant, wherein the discovery response includes a list of identifiers of one or more discovered resources that the registrant has privileges to perform the intended operations upon.

2. The method as recited in claim 1, wherein the parameter comprises an indication of at least one of an operation that the registrant intends to perform on the resource, a role that the registrant intends to assume if the registrant accesses the resource, a location at which the registrant intends to access the resource, and a subscription plan that the registrant intends to use if the registrant accesses the resource.

3. The method as recited in claim 1, the method further comprising:

when the one or more resources do not satisfy the discovery request, sending at least one resource to the registrant such that the registrant can obtain permission to access the at least one resource.

4. The method as recited in claim 1, the method further comprising:
when the one or more resources satisfy the discovery request, sending the one or more resources to the registrant.

5. The method as recited in claim 1, wherein one of a plurality of permission-based discovery response parameters indicates that the select one of the one or more resources 1) satisfies the permission based filter criteria and 2) cannot be accessed by the registrant due to a lack of permissions.

6. The method as recited in claim 5, wherein one of the permission-based discovery response parameters indicates an operation that the registrant is permitted to perform on the select one of the one or more resources.

7. The method as recited in claim 5, wherein one of the permission-based discovery response parameters indicates a role that the registrant is permitted to assume to a select one of the one or more resources.

8. The method as recited in claim 5, wherein one of the permission-based discovery response parameters indicates a location from which the registrant is permitted to access a select one of the one or more resources.

9. The method as recited in claim 5, wherein one of the permission-based discovery response parameters indicates a subscription plan that is required in order to access a select one of the one or more resources.

10. The method as recited in claim 1, wherein the registrant is an application entity or a common services entity.

11. The method as recited in claim 1, wherein the service layer is a common services entity.

12. The method as recited in claim 1, wherein the registrant is configured, via a user interface, such that the parameter is specified by a user of the registrant.

13. A network node that hosts a service layer, the network node comprising communication circuitry such that the node is coupled with a network via its communication circuitry, wherein the network node further comprises:
a processor and a memory, the memory containing computer-executable instructions that when executed by the processor, cause the processor to perform operations comprising:
receiving a discovery request, from a registrant, for one or more resources, the discovery request including a parameter that specifies one or more operations that the registrant intends to perform on the discovered resources, wherein the parameter comprises an indication of permission-based filter criteria;
based on the intended operations specified in the discovery request, determining whether one or more resources at the service layer have privileges defined that permit the registrant to perform the intended operations; and
sending a discovery response to the registrant, wherein the discovery response includes a list of identifiers of one or more discovered resources that the registrant has privileges to perform the intended operations upon.

14. The network node as recited in claim 13, wherein the parameter comprises an indication of an operation that the registrant intends to perform on the resource, a role that the registrant intends to assume if the registrant accesses the resource, a location at which the registrant intends to access the resource, and a subscription plan that the registrant intends to use if the registrant accesses the resource.

15. The network node as recited in claim 13 the operations further comprising:
when the one or more resources do not satisfy the discovery request, sending at least one resource to the registrant such that the registrant can obtain permission to access the at least one resource.

16. The network node as recited in claim 13, the operations further comprising:
when the one or more resources satisfy the discovery request, sending the one or more resources to the registrant.

17. The network node as recited in claim 13, wherein one of a plurality of permission-based discovery response parameters indicates that a select one of the one or more resources 1) satisfies the permission-based filter criteria and 2) cannot be accessed by the registrant due to a lack of permissions.

18. The network node as recited in claim 17, wherein one of the permission-based discovery response parameters indicates an operation that the registrant is permitted to perform on the select one of the one or more resources.

19. The network node as recited in claim 17, wherein one of the permission-based discovery response parameters indicates a role that the registrant is permitted to assume to the select one of the one or more resources.

20. The network node as recited in claim 17, wherein one of the permission-based discovery response parameters indicates a location from which the registrant is permitted access the select one of the one or more resources.

21. The network node as recited in claim 17, wherein one of the permission-based discovery response parameters indicates a subscription plan that is required in order to access the select one of the one or more resources.

* * * * *